(12) United States Patent  
Takahashi et al.

(10) Patent No.: US 9,360,608 B2
(45) Date of Patent: *Jun. 7, 2016

(54) POLARIZING ELEMENT

(75) Inventors: Eiji Takahashi, Miyagi (JP); Akio Takada, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 13/979,957

(22) PCT Filed: Mar. 2, 2012

(86) PCT No.: PCT/JP2012/055457
§ 371 (c)(1),
(2), (4) Date: Jul. 16, 2013

(87) PCT Pub. No.: WO2012/118204
PCT Pub. Date: Sep. 7, 2012

(65) Prior Publication Data
US 2013/0286358 A1  Oct. 31, 2013

(30) Foreign Application Priority Data
Mar. 2, 2011 (JP) .................. 2011-045092

(51) Int. Cl.
*G02B 5/30* (2006.01)
*G03B 21/14* (2006.01)
(Continued)

(52) U.S. Cl.
CPC ............ *G02B 5/3008* (2013.01); *G02B 5/3058* (2013.01); *G02F 1/133528* (2013.01); *G03B 21/14* (2013.01); *G03B 21/2073* (2013.01); *G02F 2001/133548* (2013.01)

(58) Field of Classification Search
CPC ........ G02B 1/11; G02B 1/1111; G02B 1/113; G02B 1/115; G02B 1/116; G02B 1/118; G02B 5/08; G02B 5/285; G02B 5/3058; H04N 9/315; H04N 9/3105; H04N 9/3197
USPC .............. 353/20, 94, 122; 359/494, 495, 497, 359/566, 569, 571, 574, 575, 586, 576; 430/321
See application file for complete search history.

(56) References Cited

U.S. PATENT DOCUMENTS 6,772,608 B1   8/2004 Drost et al.
7,972,017 B2 * 7/2011 Amako et al. .................. 353/98
(Continued)

FOREIGN PATENT DOCUMENTS

| JP | A-2000-147253 | 5/2000 |
| JP | A-2002-372620 | 12/2002 |
| JP | A-2008-216957 | 9/2008 |
| JP | A-2010-530994 | 9/2010 |
| JP | A-2010-530995 | 9/2010 |

OTHER PUBLICATIONS

Baba et al., "Anistropic optical media from laminated island films: theory," *J. Opt. Soc. Am. A*, Apr. 1991, 619-624, vol. 8, No. 4, Optical Society of America.

(Continued)

*Primary Examiner* — Sultan Chowdhury
(74) *Attorney, Agent, or Firm* — Oliff PLC

(57) ABSTRACT

Provided is a polarizing element having excellent optical properties and high light resistance to intense light. This polarizing element is provided with a transparent substrate, an absorbing layer disposed on the transparent substrate and constituting grid-shaped convexities arrayed at a pitch smaller than the wavelengths in the optical bandwidth used, a dielectric layer formed on the absorbing layer, and a reflective layer formed on the dielectric layer. Because the absorbing layer, which interferes with and absorbs light, is in contact with the transparent substrate, heat dissipation can be improved and heat resistance of the polarizing plate can be improved.

20 Claims, 34 Drawing Sheets

(51) Int. Cl.
*G03B 21/20* (2006.01)
*G02F 1/1335* (2006.01)

(56) References Cited

U.S. PATENT DOCUMENTS

| | | | |
|---|---|---|---|
| 2005/0277063 A1* | 12/2005 | Wang et al. | 430/311 |
| 2006/0119937 A1* | 6/2006 | Perkins et al. | 359/486 |
| 2008/0094547 A1* | 4/2008 | Sugita et al. | 349/96 |
| 2008/0278811 A1 | 11/2008 | Perkins et al. | |
| 2008/0316599 A1 | 12/2008 | Wang et al. | |
| 2009/0219617 A1* | 9/2009 | Asakawa et al. | 359/486 |
| 2010/0072170 A1* | 3/2010 | Wu et al. | 216/13 |

OTHER PUBLICATIONS

Shiraishi et al., "Microisolator," *Applied Optics*, Jan. 15, 1986, 311-314, vol. 25, No. 2, Optical Society of America.

Shiraishi et al., "Laminated Polarizers Exhibiting High Performance Over a Wide Range of Wavelength," *Journal of Lightwave Technology*, Jun. 6, 1997, 1042-1050, vol. 15, No. 6, IEEE.

International Search Report issued in International Patent Application No. PCT/JP2012/055457 dated Jun. 5, 2012.

International Preliminary Report on Patentability issued in International Patent Application No. PCT/JP2012/055457 dated May 28, 2013 (w/ translation).

\* cited by examiner

POLARIZING ELEMENT

TECHNICAL FIELD

This invention relates to a polarizing element for absorbing one of mutually orthogonal polarized components (P-polarized wave and S-polarized wave) and transmitting the other. This application claims priority to Japanese Patent Application No. 2011-045092, filed on Mar. 2, 2011, which is incorporated herein by reference.

DESCRIPTION OF THE RELATED ART

The image formation principle of liquid crystal display devices essentially requires polarizing elements provided on a surface of a liquid crystal panel. The function of the polarizing elements is to absorb one of mutually orthogonal polarized components (P-polarized wave and S-polarized wave) and to transmit the other.

Dichroic polarizing plates containing iodine or dye type organic polymer materials in films have been widely used as this kind of polarizing elements. These polarizing elements are generally manufactured by using a method including steps of dyeing a polyvinyl alcohol film with dichroic material such as iodine, performing crosslinking with a crosslinking agent and then performing uniaxial stretching. The dichroic polarizing plates tend to shrink since the manufacturing process includes this stretching step. In addition, because the polyvinyl alcohol film employs hydrophilic polymer, it is highly deformable especially under humidified conditions. Moreover, using a film as a base results in insufficient mechanical strength of the device, which may require a transparent protective film glued thereto.

In recent years, the liquid crystal display devices have been widely used in many purposes and the functionalities of them have been sophisticated. Accordingly, high reliability and durability are required on each device constituting the liquid crystal display devices. For example, in the case of liquid crystal display devices using alight source with a large luminous energy such as transmissive liquid crystal projectors, polarizing plates are exposed to intensive radiant rays. Consequently, the polarizing plates used for these are required to have an excellent heat-resisting property. However, since the above described film-based polarizing plates are made of organic materials, a limitation exists in enhancement of the property.

An inorganic polarizing plate having an excellent heat-resisting property is commercially available from Corning Incorporated in the USA under the trade name of "Polarcor". This polarizing plate has a structure in which silver particles are diffused into glass and uses no organic material such as a film. The principle of this utilizes plasma resonance absorption of island particles. Particularly, it utilizes light absorption by surface plasma resonance occurring when light enters into the island particles of precious metals or transition metals and the absorption wavelength depends on the shapes of the particles and the permittivity therearound. Using elliptical-shaped island particles can differentiate the resonance wavelengths in major and minor axis directions, thereby achieving a polarizing property. In particular, they absorb polarized components parallel to the major axis and transmit polarized components parallel to the minor axis in long wavelength range. However, the Polarcor, which only polarizes lights in the wavelength range near infrared region, does not cover visible light range required in liquid crystal displays. This is due to the physical property of silver used for the island particles.

Patent literature (PTL) 1 discloses a UV polarizing plate using silver as metal particles, wherein the particles are educed in glass by heat reduction to apply the above described principle. In this case, it is suggested that absorption in minor axis is utilized in contrast to the above mentioned Polarcor. Although the FIG. 1 of PTL 1 shows a function as a polarizing plate near 400 nm, the extinction ratio is small and the absorbable wavelength rage is extremely narrow such that the polarizing plate cannot cover the entire visible light range even if Polarcor and the technologies of PTL 1 are combined.

Non patent literature (NPL) 1 theoretically analyzes inorganic polarizing plates using plasma resonance of metal island particles. This literature describes that resonance wavelength of aluminum particles is approximately 200 nm shorter than that of silver particles, so that a polarizing plate covering visible light range can possibly be manufactured by using aluminum particles.

NPL 2 discloses some methods of manufacturing a polarizing plate by using aluminum particles. According to this literature, silicate-based glasses are not preferable for the substrate since aluminum reacts with the glasses and calcium aluminoborate glasses are suitable for this purpose (paragraphs 0018 and 0019). This limitation is at an economic disadvantage since the silicate-based glasses are widely spread as optical glasses and reliable products of them can be obtained at low cost. The literature also describes a method for forming island particles by etching a resist pattern (paragraphs 0037 and 0038). In general, a polarizing plate used in a projector is required to have a size of several centimeters and a high extinction ratio. Consequently, in the case of a polarizing plate for visible light, the resist pattern should have a size of several tens nanometers in order to be sufficiently shorter than visible light wavelengths and the high extinction ratio requires a high density pattern. Moreover, when used in a projector, a large area is required. In the described method of forming a high-density micro pattern by lithography, however, electron beam drawing technology and the like should be used to obtain the above-described pattern. The electron beam drawing technology, which draws respective patterns by electron beam, is not practical due to the low productivity thereof.

Although PTL 2 describes that aluminum are removed with chlorine plasma, in this case, chloride is likely to adhere to the aluminum pattern etched in such a manner. It can be removed with a commercially available wet etchant (for example, SST-A2 available from Tokyo Ohka Kogyo Co., Ltd. in Japan); however, the etchant of this kind reacting with aluminum chloride also reacts with aluminum with a lower etching rate, making it difficult to form a desired pattern by using the described method.

In addition, PTL 2 also describes another method in which aluminum is deposited on a photo resist by glancing angle deposition (GLDA) and then the photo resist is removed (paragraphs 0045 and 0047). In this kind of method, it is contemplated that aluminum must be deposited also on the substrate surface in a certain extent to obtain an adhesion between the substrate and the aluminum. This means, however, the shape of the deposited aluminum film will differ from prolate sphere including prolate spheroid described as a suitable shape in paragraph 0015. As described in paragraph 0047, over-deposited materials are removed by anisotropic etching perpendicular to the surface. The shape anisotropy of aluminum is essential for the function of the polarizing plate. It therefore seems to be necessary that the amounts of aluminum deposited on resist part and substrate surface should be adjusted in order to obtain a desired shape by etching; however, controlling these in a size less than sub-micron size, such as 0.05 µm as described in paragraph 0047 is extremely difficult. Consequently, the productivity of this manufacturing method is suspicious. In addition, although the polarizing plate is required to have a property of a high transmittance in transmission axis direction, in the case of glass substrate, reflection of several percent from the glass interface is usually unavoidable, making it difficult to obtain the high transmittance.

PTL 3 discloses a method of forming a polarizing plate by glancing angle deposition (GLDA). This method, which obtains a polarizing property by forming micro-prismatic structures by glancing angle deposition of materials transparent and opaque to wavelengths in used bandwidth, seems to have a high productivity since micro patterns can be obtained by a process easier than the process explained in PTL 1. It should be noted that, the aspect ratio of the micro-prismatic structures of the material opaque to wavelengths in used bandwidth, the distance between each micro-prismatic structure and the linearity of the micro-prismatic structures are essential parameters for obtaining an excellent polarizing property and these parameters should be intentionally controlled also from a view point of property reproducibility; however, intentionally controlling these parameters is difficult since this method utilizes a phenomenon in which initial deposition layer of vapor particles blocks the subsequent vapor particles so that the prismatic structures are obtained by the lack of deposition of the vapor particles due to this shading. For dealing this problem, described is a method of providing polishing traces on a substrate by a rubbing process before the vapor deposition. Since the particle diameter of the vapored film is at most several tens nanometers, pitches less than sub-micron size should be intentionally produced by polishing in order to control the anisotropy of the particles. Unfortunately, ordinary polishing sheets, having a limitation of sub-microns, cannot easily produce such microscopic polishing traces. Furthermore, although the resonance wavelength of Al particles strongly depends on the refractive index therearound and how to combine the transparent and opaque materials is important in this case, no combination is disclosed in PTL 3 for obtaining an excellent polarizing property in visible light range. In addition, similarly to the case of PTL 1, when using a glass for the substrate, reflection of several percent from the glass interface is unavoidable.

NPL 2 discloses a polarizing plate named Lamipol for infrared communication. This has a laminated structure of Al and $SiO_2$ and, according to this literature, has an extremely high extinction ratio. NPL 3 describes that using Ge instead of Al, which is light absorbing part of Lamipol, can achieve a high extinction ratio at wavelengths less than 1 µm. Te (tellurium) is also expected to achieve a high extinction ratio, according to FIG. 3 of the NPL 3. Although Lamipol is an absorbing typed polarizing plate achieving a high extinction ratio as described above, since the size of the light receiving surface is the lamination thickness of the light absorbing and transmitting materials, Lamipol is not suitable for use in projectors requiring the size of several centimeters square.

PTL 4 describes a structure and property of an inorganic polarizing plate wherein a dielectric layer and inorganic micro particle layer are deposited on a metal grid and shows a high contrast can be obtained by this structure. It is supposed that further evolution of this structure can provide an inorganic polarizing plate having an increased contrast and a reduced reflection ratio and capable of being manufactured by a simple process, which will be more valuable for industrial purposes.

Unfortunately, the technology of PTL 4 hardly dissipates the heat converted by light absorption because the inorganic micro particle layer absorbing light is located at an air interface so that the temperature of the polarizing plate tends to increase due to the heat absorption. For this reason, it has a low light-fastness against strong light. A structure in which a reflection protecting layer added just under a reflective layer is described in paragraph [0083]. In this case, the upper inorganic micro particle layer might not be necessary depending on usage.

CITATION LIST

Patent Literatures

PTL 1: U.S. Pat. No. 6,772,608
PTL 2: Japanese Unexamined Patent Publication No. 2000-147253
PTL 3: Japanese Unexamined Patent Publication No. 2002-372620
PTL 4: Japanese Unexamined Patent Publication No. 2008-216957

Non Patent Literatures

NPL 1: J. Opt. Soc. Am. A Vol. 8, No. 4 619-624
NPL 2: Applied Optics Vol. 25 No. 2 1986 311-314
NPL 3: J. Lightwave Tee. Vol. 15 No. 6 1997 1042-1050

SUMMARY OF THE INVENTION

Technical Problem

Having regard to the above, an object of the present invention is to provide a polarizing element having an excellent optical property and a high light-fastness against strong light.

Means for Solving the Problem

To solve the above-mentioned problems, a polarizing element according to an aspect of the present invention comprises: a transparent substrate; an absorbing layer constituting, on the transparent substrate, grid-shaped convexities arrayed at a pitch smaller than a wavelengths in a used optical bandwidth; a dielectric layer formed on the absorbing layer constituting the grid-shaped convexities; and a reflective layer formed on the dielectric layer constituting the grid-shaped convexities.

A projector according to another aspect of the present invention comprises a polarizing element stated above, a light source and an image display panel, wherein the polarizing element receives light in a used optical bandwidth from the light source at a side close to the transparent substrate and transmits the light.

Advantageous Effect of the Invention

According to the present invention, the absorbing layer interfering with and absorbing light contacts the transparent substrate, thereby improving heat-resisting property of the polarizing element. In addition, the selective light absorbing effect on polarized waves of the absorbing layer achieves an excellent optical property.

DESCRIPTION OF EMBODIMENTS

Figure 1:
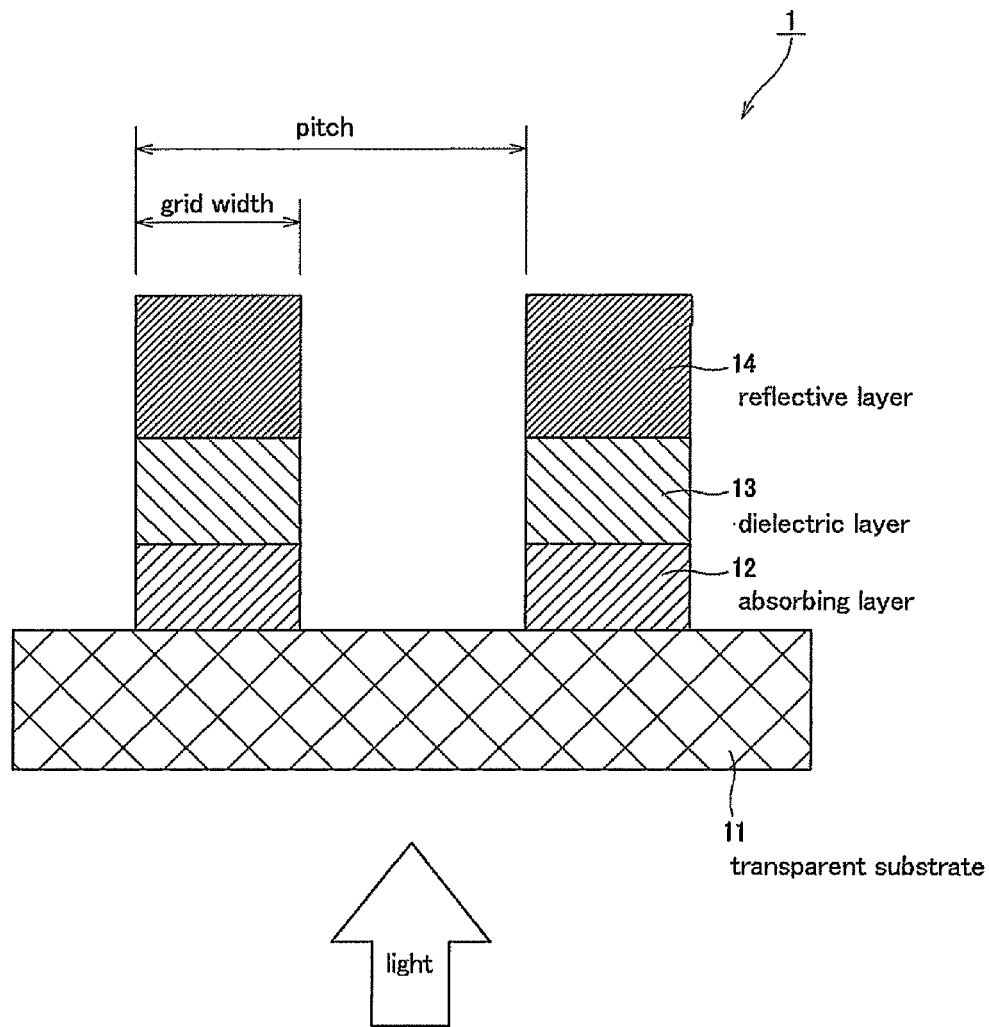
FIG. 1 is a schematic cross sectional view of a polarizing element according to an embodiment of the present invention.

Embodiments of the present invention will now be more particularly described with reference to the accompanying drawings according to the following order.
1. Constitution of a Polarizing Element
2. Manufacturing Method of a Polarizing Element
3. Exemplary Constitution of a Liquid Crystal Projector
4. Examples 1. Constitution of a Polarizing Element FIG. 1 is a schematic cross sectional view of a polarizing element according to an embodiment of the present invention. As shown in FIG. 1, a polarizing element 1 comprises a transparent substrate 11, an absorbing layer 12 constituting, on the transparent substrate 11, grid-shaped convexities arrayed at a pitch smaller than wavelengths in a used optical bandwidth, a dielectric layer 13 formed on the absorbing layer 12, and the reflective layer 14 formed on the dielectric layer 13. That is, the polarizing element 1 has a one-dimensional lattice shaped wire-grid structure in which the convexities formed by layering the absorbing layer 12, the dielectric layer 13 and the reflective layer 14 in this order from the transparent substrate 11 are arranged with a regular interval on the transparent substrate 11.

The transparent substrate 11 is formed of a material transparent to the light in the used optical bandwidth and having a refractive index of 1.1 to 2.2, such as glass, crystal and sapphire. In this embodiment, it is preferable to employ quartz crystal or sapphire having a high thermal conductivity as the material to form the transparent substrate 11. This achieves a high light-fastness against strong light, thereby realizing a polarizing element suitable for use in an optical engine of a projector that produces large amount of heat.

In the case that the transparent substrate 11 is formed of an optically active crystal such as crystal quartz, excellent optical properties can be obtained by arranging the grid-shaped convexities in parallel or perpendicular direction relative to the optical axis of the crystal. The "optical axis" used herein means a directional axis that minimizes the difference between refractive indices of ordinary ray (O) and extraordinary ray (E) of the light travelling along the direction thereof.

It should be noted that, depending on the application of the polarizing element, glass, particularly quartz (refractive index of 1.46) or soda-lime glass (refractive index of 1.51) may be used. Since the component composition of the glass material has no special limitation, inexpensive glass materials such as silicate glass can be used and thus producing cost can be reduced.

The absorbing layer 12 is formed of one or more types of materials, such as metals or semiconductors, having light absorption effect wherein extinction coefficient of optical constant is not equal to zero, the selection of the materials depending on wavelength range of the light applied. Examples of metal materials include simple substances such as Ta, Al, Ag, Cu, Au, Mo, Cr, Ti, W, Ni, Fe and Sn, and alloys of these substances. Examples of semiconductor materials include Si, Ge, Te, ZnO and suicide materials (β-FeSi$_2$, MgSi$_2$, NiSi$_2$, BaSi$_2$, CrSi$_2$, CoSi$_2$ and TaSi). In the case of a semiconductor material, band gap energy of the semiconductor must be below the used optical bandwidth, since the band gap energy affects the absorption effect. For example, when used with visible light, a material absorbing wavelengths of equal to or longer than 400 nm, therefore having a band gap of below 3.1 eV must be used.

It is preferable that the material of the absorbing layer 12, selected from the above described metal or semiconductor materials, has a refractive index higher than that of the transparent substrate 11. In addition, the absorbing layer 12 is preferably constituted with more than one layers formed of different materials and one of the layers preferably has a refractive index higher than that of the transparent substrate 11. Combining the above described metal and/or semiconductor materials can enhance the interference effect on the light in the used optical bandwidth, thereby increasing contrast in transmission axis direction at a desired wavelength and reducing reflective component from the polarizing plate, which is not preferable in transmissive liquid crystal display devices.

Actual combination of materials is selected based on optical constants including refractive index n and extinction coefficient k. For example, when using Si having a high refractive index (n=4.08 (550 nm), k=0.04), combining it with Ta having a large refractive index difference and an extinction coefficient higher than that of Se can enhance the absorbing and interference effects, thereby increasing contrast. In the case of using crystal quartz (n=1.54 (550 nm), k=0.00) as the transparent substrate 11, forming a Ta layer having a small refractive index difference on the substrate and forming an Si layer on the Ta layer can suppress reflection, thereby improving transmittance.

Furthermore, reducing the width in transmission axis direction (X-axis direction) of the absorbing layer 12 relative to the other layers can shift the wavelength minimizing the reflectance toward the short wavelength side. Consequently, the reflectance in desired wavelength can be reduced by optimally designing the pitch and grid width. Particularly, the width in transmission axis of the absorbing layer 12 is preferably equal to or more than 50% of the grid (the reflective layer and the dielectric layer) width, and more preferably, equal to or more than 80% of the grid width. The width (in X-axis direction) of the absorbing layer 12 less than 50% of the grid width degrades thermal conductivity and physical strength.

It is preferable to form the absorbing layer 12 as a high-density film by means of vapor deposition or spattering. The high-density film will improve the thermal conductivity and heat dissipation.

The film of the absorbing layer 12 may be obtained by depositing inorganic particles by means of glancing angle deposition (GLDA) method with vapor deposition or spattering utilizing shadowing effect. In this case, preferably, the inorganic particles are of the size smaller than the wavelengths in the used bandwidth and each particle is perfectly isolated from each other. The shape of the inorganic particles is prolate spheroid, the major axis of the prolate spheroid being oriented in parallel with the absorption axis, i.e. Y-axis direction and the minor axis of the prolate spheroid being oriented in parallel with the transmission axis, i.e. X-axis direction. The absorbing layer 12 thus formed, in which the optical constants in the absorption axis Y direction are larger than the optical constants in the transmission axis X direction, has an optical anisotropy. In particular, the refractive index in the absorption axis Y direction is larger than the refractive index in the transmission axis X direction and the extinction coefficient in the absorption axis Y direction is larger than the extinction coefficient in the transmission axis X direction.

The dielectric layer 13 is formed to have a film thickness that shifts a phase of a polarized light transmitted through the absorbing layer 12 and reflected at the reflective layer 14 by a half wavelength relative to a polarized light reflected at the absorbing layer 12. Actual film thickness is appropriately determined within the range of 1 to 500 nm capable of adjusting the phase to enhance the interference effect. In the present embodiment, since the absorbing layer 12 absorbs the reflected light, the contrast will be improved without optimizing the film thickness, so that it may be practically determined by balancing a desired polarizing property and an actual manufacturing process.

As for the material constituting the dielectric layer 13, conventional materials including SiO$_2$, Al$_2$O$_2$ and MgF$_2$ can be used. The refractive index of the dielectric layer 13 is preferably in the range of 1.0 to 2.5. The property of the polarizing element may be controlled by the material of the dielectric layer 13 since the optical property of the absorbing layer 12 is also affected by the refractive index therearound.

The reflective layer 14 is formed on the dielectric layer 13 by arranging belt-shaped metal films extending in Y direction, which is the absorption axis of the dielectric layer 13. That is, the reflective layer 14 has a function as a wire grid polarizer that attenuates the polarized wave having an electric field component parallel to the longitudinal direction (Y-axis direction) of the wire grid (TE wave (S-polarized wave)) of the light entered from the transparent substrate 11 and transmits the polarized wave having an electric field component perpendicular to the longitudinal direction (X-axis direction) of the wire grid (TM wave (P-polarized wave)).

The material constituting the reflective layer 14 is not specially limited as long as it reflects the light in the used bandwidth; for example, simple substances such as Al, Ag, Cu, Mo, Cr, Ti, Ni, W, Fe, Si, Ge and Te, alloys of these substances and semiconductor materials may be used. Instead of metal materials, it can be constituted by inorganic film other than metal or resin film formed to have a surface with a high reflectance by coloring, for example.

The pitch, line width/pitch, film height (thickness, grid depth) and film length (grid length) of the reflective layer 14 are preferably in the following range.

0.05 μm<pitch<0.8 μm
0.1<(line width/pitch)<0.9
0.01 μm<height<1 μm
0.05 μm<film length It is preferable to provide a protective film covering the surfaces of the transparent substrate 11 and the grid-shaped convexities as long as the change of the optical property has no effect on practical use. For example, depositing SiO$_2$ will improve reliability such as moisture resistance. The protective film is preferably formed by plasma chemical vapor deposition (CVD). The plasma CVD can deposit the protective film also in the gaps between the grid-shaped convexities.

The polarizing element 1 in this constitution can attenuate the polarized wave having an electric field component parallel to the grid of the reflective layer (TE wave (S-polarized wave)) and transmit the polarized wave having an electric field component perpendicular to the grid of the reflective layer (TM wave (P-polarized wave)) by utilizing four activities of transmission, reflection, interference and selective light absorption of the polarized waves. In other words, TE wave is attenuated by the selective light absorbing effect of the absorbing layer 12 and TE wave transmitted through the absorbing layer 12 and the dielectric layer 13 is reflected by the grid-shaped reflective layer 14 that functions as a wire grid. By appropriately adjusting the thickness and refractive index of the dielectric layer 13, a part of the TE wave reflected by the reflective layer 14 and being transmitted through the absorbing layer 12 can be reflected back to the reflective layer 14, and the light transmitted through the absorbing layer 12 can be attenuated by interference. A desired polarizing property can be obtained by this selective attenuation of TE wave.

In addition, the polarizing element 1 of the present embodiment can improve the thermal conductivity and heat-resisting property of the polarizing plate since the absorbing layer 12 interfering with and absorbing light contacts the transparent substrate 11. Moreover, the polarizing element 1 of the present embodiment, constituted by inorganic material having a durability higher than that of organic material, has an improved reliability with a high light-fastness against strong light such as a light used in a liquid crystal projector.

As for an actual constitution of the polarizing element 1 having a high light-fastness, it is preferable to use a material with a high thermal conductivity such as crystal quartz (about 10 W/(m·K) at 300 K) or sapphire (about 40 W/(m·K) at 300 K) for the transparent substrate 11. In addition, the thermal conductivity of the material constituting the absorbing layer 12 is preferably higher than the thermal conductivity of the material constituting the transparent substrate 11 since the absorbing layer 12 contacts the transparent substrate 11. In particular, the absorbing layer 12 is preferably constituted by a material having a thermal conductivity higher than 50 W/(m·K) at 300 K such as metal materials including Ta (about 60 W/(m·K) at 300 K), Al (about 235 W/(m·K) at 300 K), Ag (about 430 W/(m·K) at 300 K), Cu (about 400 W/(m·K) at 300 K), Au (about 315 W/(m·K) at 300 K), Mo (about 140 W/(m·K) at 300 K), Cr (about 95 W/(m·K) at 300 K), W (about 175 W/(m·K) at 300 K), Ni (about 90 W/(m·K) at 300 K), Fe (about 80 W/(m·K) at 300 K) and Sn (about 65 W/(m·K) at 300 K) or semiconductor materials including Si (about 150 W/(m·K) at 300 K), Ge (about 60 W/(m·K) at 300 K) and ZnO (about 55 W K) at 300 K). When constituting the absorbing layer 12 by two layers of Ta and Si, the Si layer having a thermal conductivity higher than that of the Ta layer is preferably provided at the side contacting the transparent substrate 11. The polarizing element with this constitution exhibits an excellent heat-resisting property by reducing thermal contact resistance at the interface between the transparent substrate 11 and the absorbing layer 12.

2. Manufacturing Method of a Polarizing Element

A manufacturing method of a polarizing element according to the present embodiment will be explained hereinafter. Firstly the absorbing layer 12, the dielectric layer 13 and the reflective layer 14 are deposited on the transparent substrate 11 in this order.

The absorbing layer 12 is deposited by means of vapor deposition or spattering. More particularly, the deposition of the absorbing layer 12 is conducted by positioning the transparent substrate 11 against a target and making argon particles to collide the target, such that the target material removed by the collision impact is deposited on the transparent substrate 11. Alternatively, the absorbing layer 12 may be formed by depositing inorganic particles by means of glancing angle deposition (GLDA) method with vapor deposition or spattering utilizing shadowing effect.

In addition, the dielectric layer 13 and the reflective layer 14 can be formed by a typical vacuum deposition method including sputtering method, vapor growth method and vapor deposition method, or sol-gel method (for example, a method in which a sol is coated by spin coating and then gelated by thermosetting).

A grid-shaped mask pattern is formed by nanoimprint or lithography on the reflective layer 14 deposited by the process described above and then grid-shaped convexities are formed by dry etching. Gases usable in the dry etching include $Ar/O_2$ for anti-reflecting coating (BARC), $Cl_2/BCl_3$ for AlSi and $CF_4/Ar$ for $SiO_2$, Si and Ta. Optimizing etching conditions (gas flow rate, gas pressure, power and cooling temperature of the substrate) will achieve a grid shape having a high verticality. The width (in X-axis direction) of the absorbing layer 12 can also be adjusted by the etching conditions.

In the case when Al or AlSi is used for the reflective layer 14, materials capable of being etched by fluorine are preferably selected as materials for the absorbing layer 12 and the dielectric layer 13. This results in a high etching selectivity, thereby widening the range of film thickness design value of the absorbing layer 12 and the dielectric layer 13, which is advantageous in view of process construction.

It is possible to deposit a protective film such as an SA film on the top portion for improving reliability such as moisture resistance as long as the change of the optical property has no effect on practical use.

3. Exemplary Constitution of a Liquid Crystal Projector

A liquid crystal projector according to the present invention will be explained hereinafter. A liquid crystal projector 100 comprises a lamp as a light source, a liquid crystal panel and the above-described polarizing element 1.

Figure 2:
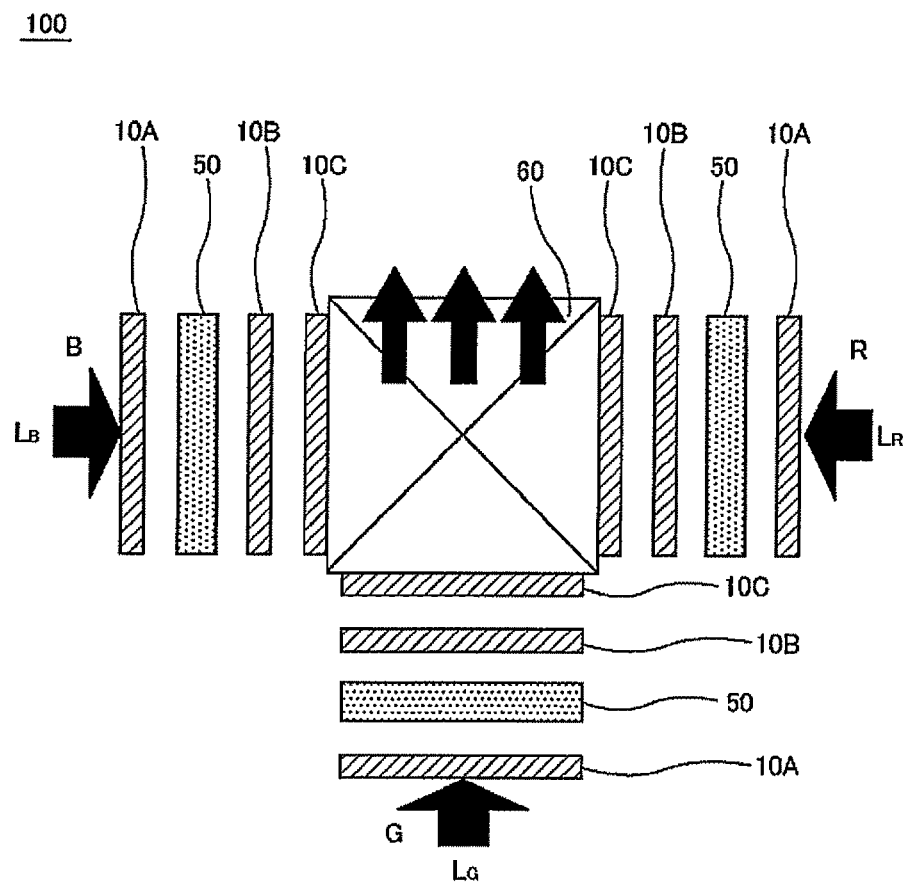
FIG. 2 is a schematic cross sectional view of a liquid crystal projector according to an embodiment of the present invention.

FIG. 2 shows an exemplary configuration of an optical engine of the liquid crystal projector according to the present invention. The optical engine of the liquid crystal projector 100 comprises an input-side polarizing element 10A, a liquid crystal panel 50, an output-side pre-polarizing element 10B and an output-side main polarizing element 10C for red light LR, an input-side polarizing element 10A, a liquid crystal panel 50, an output-side pre-polarizing element 10B and an output-side main polarizing element 10C for green light LG, an input-side polarizing element 10A, a liquid crystal panel 50, an output-side pre-polarizing element 10B and an output-side main polarizing element 10C for blue light LB, and across dichroic prism 60 for combining lights output from the respective output-side main-polarizing elements 10C and outputting the combined light to a projector lens. It should be noted that the above-described polarizing element 1 is applied to each of the input-side polarizing elements 10A, the output-side pre-polarizing elements 10B and the output-side main polarizing elements 10C, thereby receiving light in used bandwidth from the light source at the side close to the transparent substrate 11 and transmitting the light.

This liquid crystal projector 100 has a constitution which separates light output from a light source lamp (not shown) into red light LR, green light LG and blue light LB at a dichroic mirror (not shown), inputs them into the respective input-side polarizing elements 10A corresponding to the respective lights, and then spatially modulates the lights LR, LG and LB polarized by the respective input-side polarizing elements 10A at the liquid crystal panels 50. The lights output from the liquid crystal panels 50 traveled through the output-side pre-polarizing elements 10B and the output-side main polarizing elements 10C are combined at the cross dichroic prism 60 and then projected from a projector lens (not shown). By using the polarizing element 1 having an excellent light-fastness against strong light, even when a high power light source lamp is used, the projector guarantees high reliability.

It should be noted that the polarizing element according to the present invention is not limited to be used in the above-described liquid crystal projector, but can be applied to any polarizing elements that are exposed to heat in their operating environments. For example, the polarizing element can be applied to a polarizing element for liquid crystal displays of car navigation systems or instrument panels of automobiles.

EXAMPLES

4. Examples

Examples of the present invention will be explained hereinafter. In these examples, after manufacturing samples of single layer structures (Ta and Si) and a double layer structure (Ta/Si) for the absorbing layer 12, the optical properties of them are evaluated. It should be note that, the present invention is not limited to these examples.

Example 1

Absorbing Layer Ta

Figure 3A:
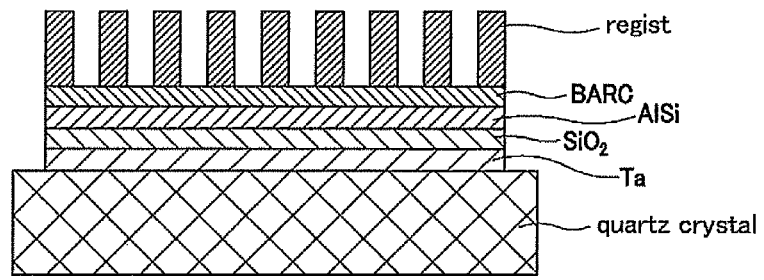
FIGS. 3A to 3D illustrate a manufacturing method of a polarizing element.

Firstly, as shown in FIG. 3A, a Ta layer as an absorbing layer, an $SiO_2$ layer as a dielectric layer and an AlSi layer as a reflective layer were deposited on a crystal quartz substrate. Next, an anti-reflecting coating (BARC) was deposited on the reflective layer and a grid-shaped mask pattern was formed by a resist. Note that the absorbing layer, the dielectric layer and the reflective layer were layered in parallel with the optical axis of the crystal of the crystal quartz.

Figure 3B:
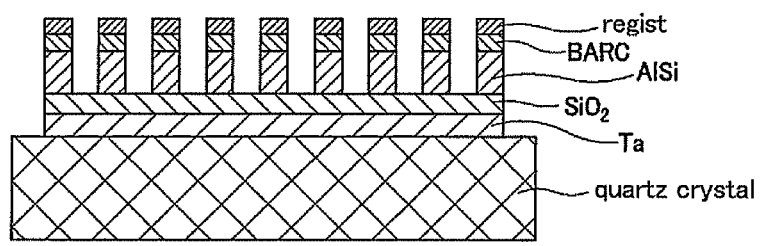
Figure 3C:
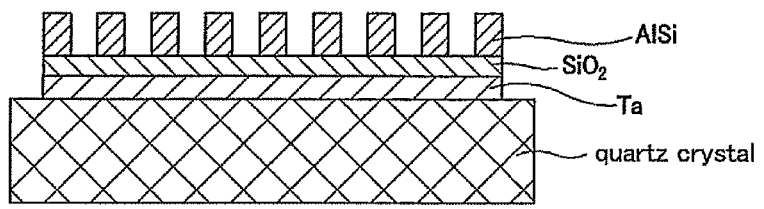
Figure 3D:
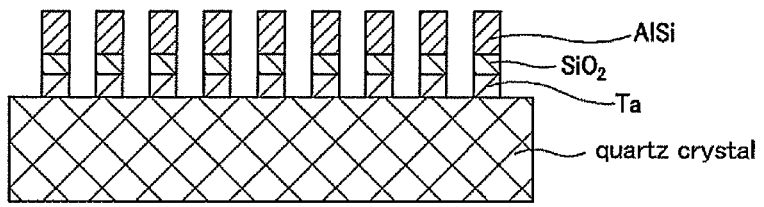

Next, as shown in FIG. 3B, the anti-reflecting coating was removed by scumming process with $Ar/O_2$ gas, and the AlSi was etched with $Cl_2/BCl_3$. Subsequently, as shown in FIG. 3C, a corrosion layer (chloride compound) was removed by $H_2O$ plasma and the resist and the anti-reflecting coating was removed by $O_2$ ashing. Finally, as shown in FIG. 3D, $SiO_2$, Ta and quartz crystal were etched with $CF_4/Ar$ gas to form grid-shaped convexities, thereby completing the polarizing element of Example 1.

Figure 4:
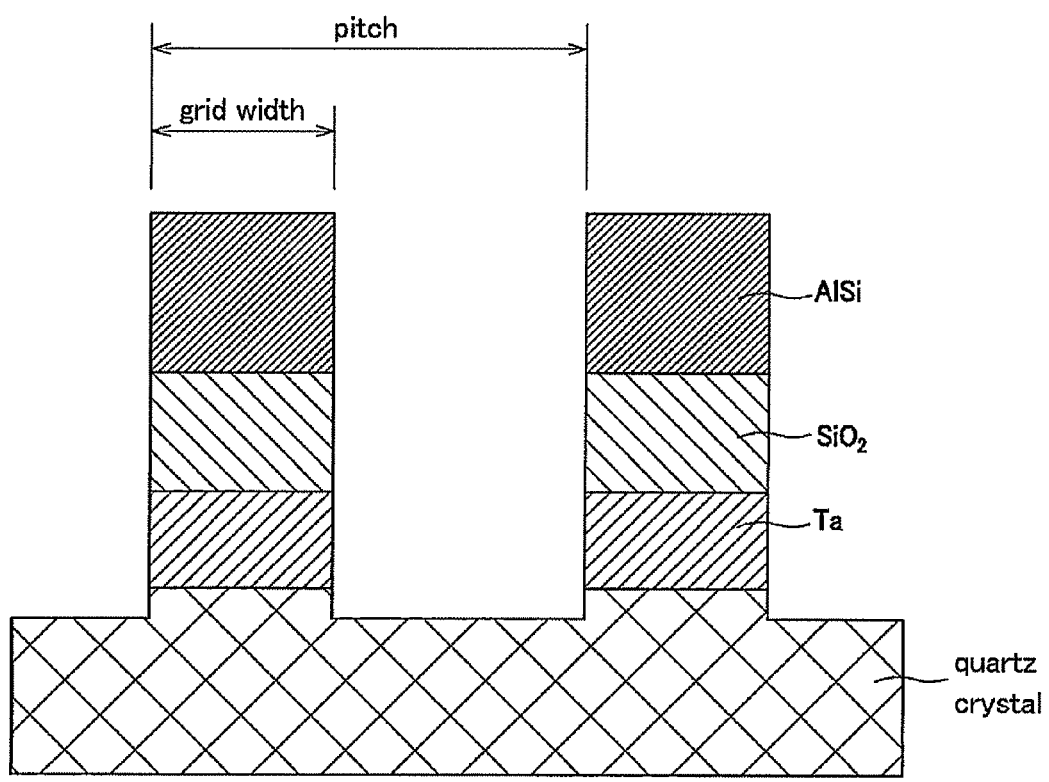
FIG. 4 is a schematic cross sectional view of a polarizing element having an absorbing layer of Ta.

FIG. 4 is a schematic cross sectional view of the polarizing element of Example 1. This polarizing element was designed to minimize reflectance at contrasts (extinction ratio:transmission axis transmittance/absorption axis transmittance) of 2 to 10 in green range (around 500 nm), which is practically important in liquid crystal display devices, with the pitch of 150 nm, grid width of 45 nm, Ta thickness of 20 nm, $SiO_2$ thickness of 50 nm and AlSi thickness of 45 nm.

Figure 5:
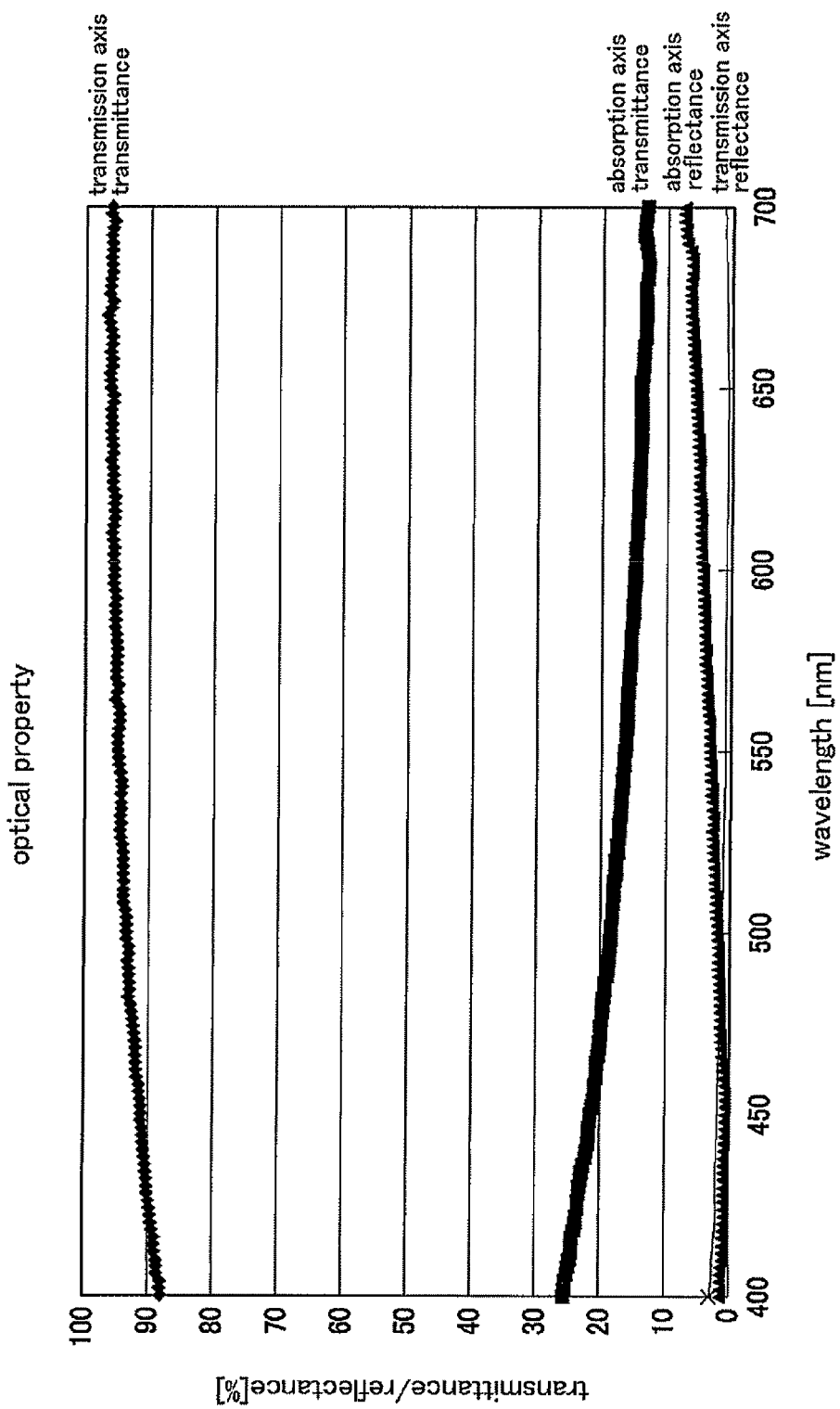
FIG. 5 is a graph showing optical properties of a polarizing element having an absorbing layer of Ta.

FIG. 5 shows the optical property of the polarizing element of Example 1. The result shown in FIG. 5 reveals that the polarizing element using Ta as an absorbing layer has an excellent contrast in long wavelength range.

Figure 6:
FIG. 6 is a (first) SEM image of a cross section of a polarizing element having an absorbing layer of Ta.

FIG. 6 shows Scanning Electron Microscope (SEM) image of the polarizing element of Example 1. According to this cross-sectional image, it is apparent that the width of the absorbing layer in transmission axis direction is smaller than those of the other layers (the reflective layer and the dielectric layer). The smaller width of the absorbing layer relative to the other layers, which is due to the etching process with $CF_4/Ar$ gas, can shift the wavelength minimizing absorption axis reflectance Rs toward the short wavelength side.

Figure 7:
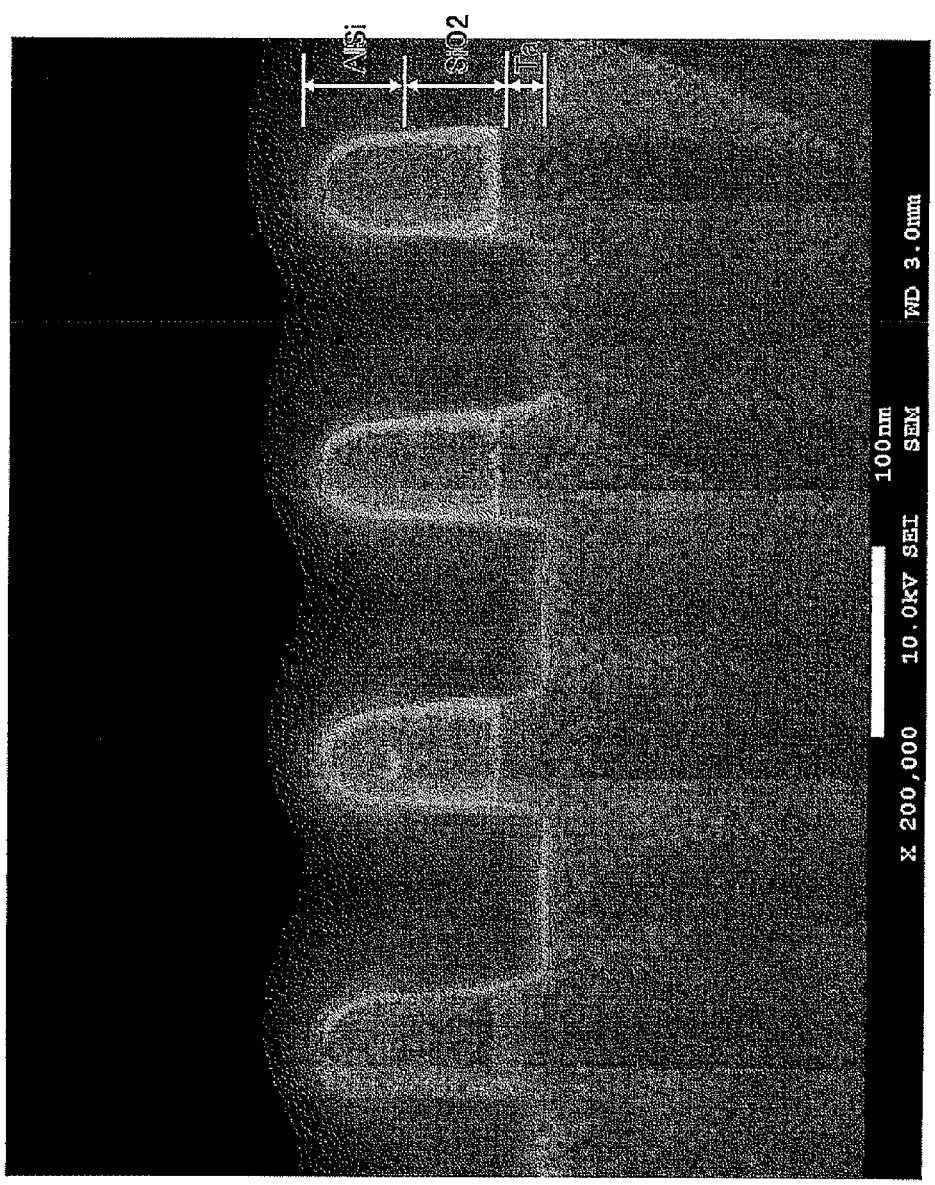
FIG. 7 is a (second) SEM image of a cross section of a polarizing element having an absorbing layer of Ta.

Although the quartz crystal substrate of the polarizing element of Example 1 is recessed by over etching to expose the quartz crystal substrate, the etching conditions may be altered so as not to recess the quartz crystal substrate. FIG. 7 shows an SEM image of the cross-section of a polarizing element in which the quartz crystal substrate is not recessed. No substantial change in the optical property of the polarizing element was found between the case of forming the recess by over etching and the case not forming the recess.

Example 2

Absorbing Layer Si

Figure 8:
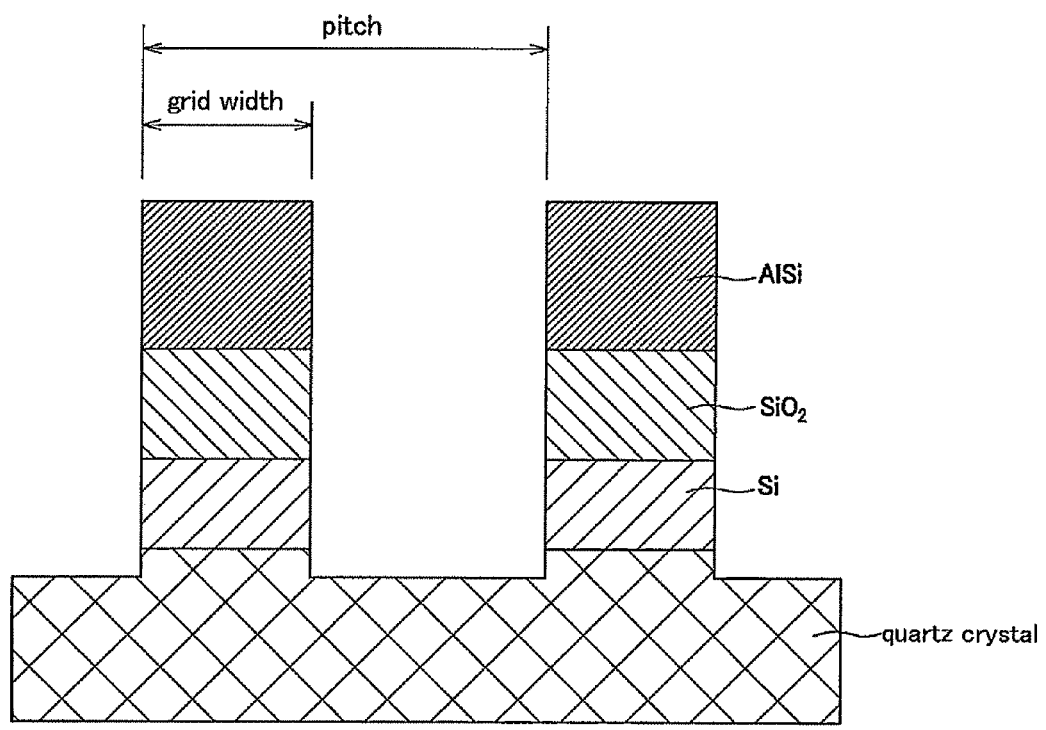
FIG. 8 is a schematic cross sectional view of a polarizing element having an absorbing layer of Si.

FIG. 8 is a schematic cross sectional view of the polarizing element of Example 2. This polarizing element was designed to minimize reflectance at contrasts (extinction ratio:transmission axis transmittance/absorption axis transmittance) of 2 to 10 in green range (around 500 nm), which is practically important in liquid crystal display devices, with the pitch of 150 nm, grid width of 45 nm, Si thickness of 20 nm, $SiO_2$ thickness of 30 nm and AlSi thickness of 45 nm. The polarizing element of Example 2 is manufactured by the same processes as Example 1 except that the absorbing layer is formed of Si.

Figure 9:
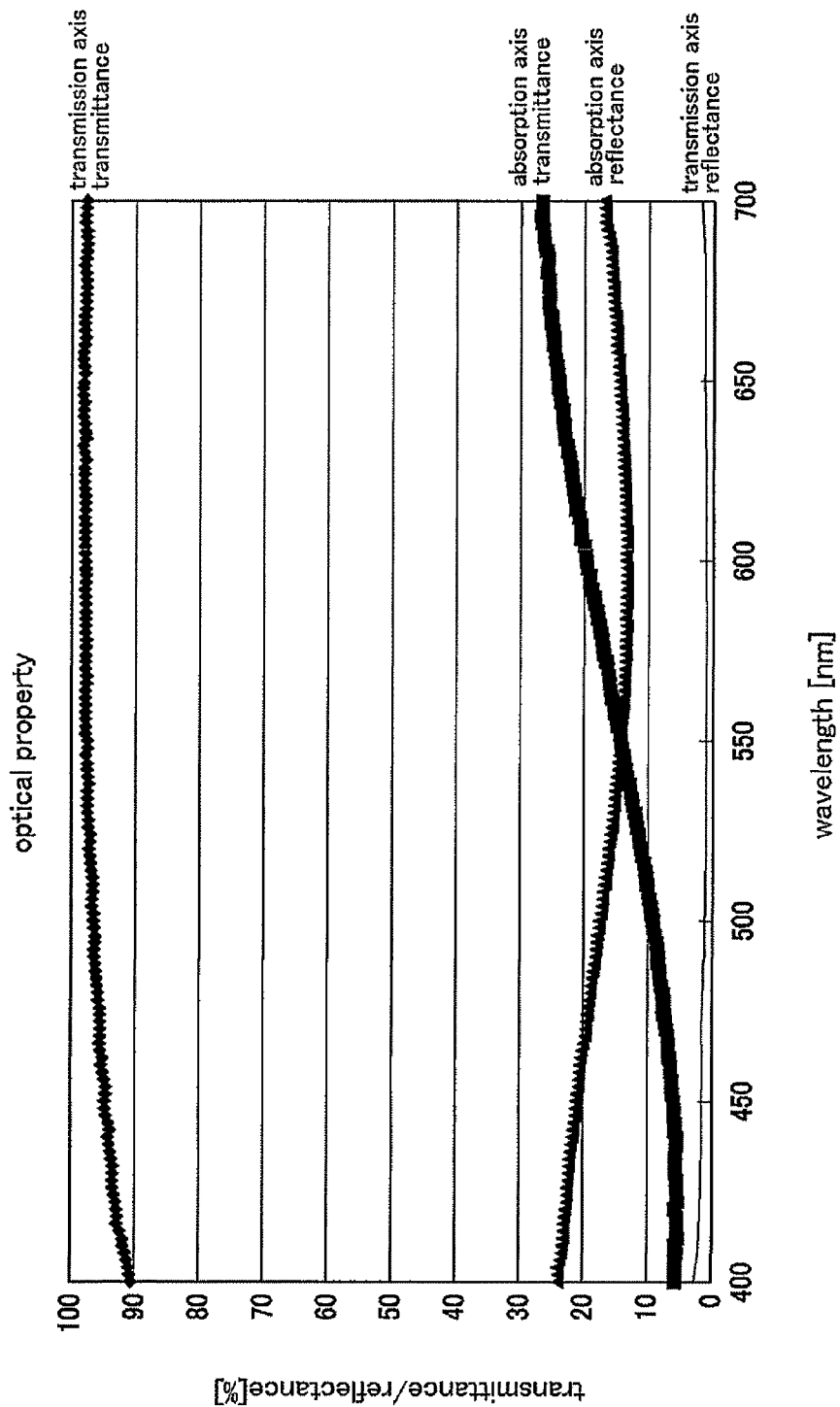
FIG. 9 is a graph showing optical properties of a polarizing element having an absorbing layer of Si.

FIG. 9 shows the optical property of the polarizing element of Example 2. The result shown in FIG. 9 reveals that the polarizing element using Si as an absorbing layer has an excellent contrast in short wavelength range.

Example 2

Absorbing Layer Ta/Si

Figure 10:
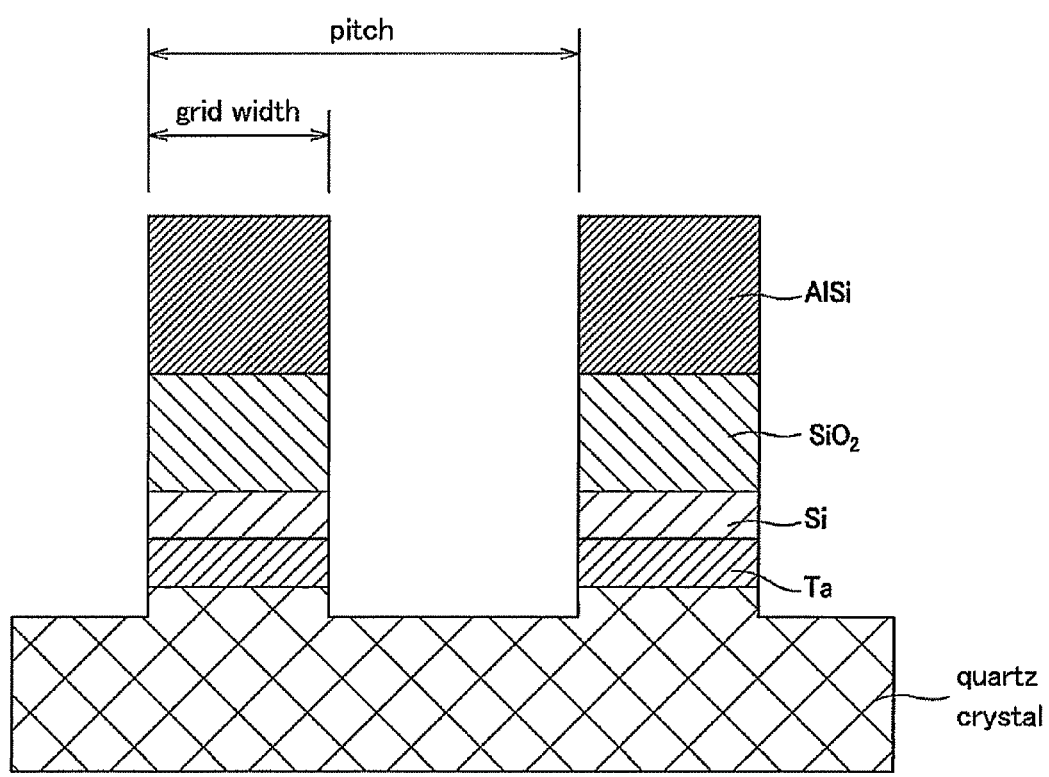
FIG. 10 is a schematic cross sectional view of a polarizing element having an absorbing layer of Ta/Si.

FIG. 10 is a schematic cross sectional view of the polarizing element of Example 3. This polarizing element was designed to minimize reflectance at contrasts (extinction ratio:transmission axis transmittance/absorption axis transmittance) of 2 to 10 in green range (around 550 nm), which is practically important in liquid crystal display devices, with the pitch of 150 nm, grid width of 45 nm, Ta thickness of 10 nm, Si thickness of 10 nm, $SiO_2$ thickness of 30 nm and AlSi thickness of 45 nm. The polarizing element of Example 3 was manufactured by the same processes as Example 1 except that the absorbing layer was formed as two-layer structure of Ta and Si.

Figure 11:
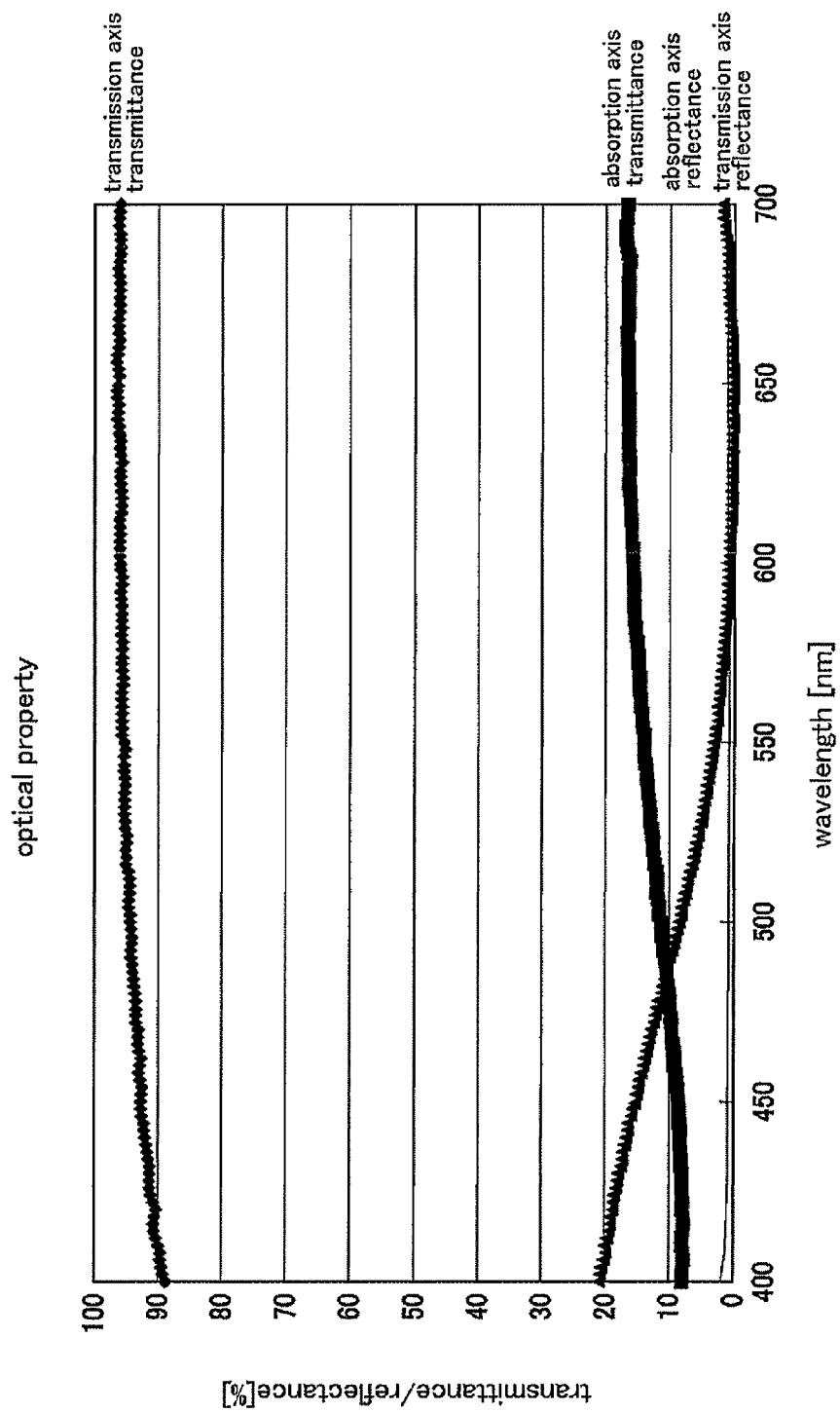
FIG. 11 is a graph showing optical properties of a polarizing element having an absorbing layer of Ta/Si.

FIG. 11 shows the optical property of the polarizing element of Example 3. The result shown in FIG. 11 reveals that the polarizing element in which Ta and Si are layered to form an absorbing layer has both of the excellent contrasts in long wavelength range similar to Example 1 and in short wavelength range similar to Example 2.

[The Properties of the Polarizing Elements of Examples 1 to 3]

Table 1 shows average values of transmittances and reflectances of the polarizing elements of Examples 1 to 3 when measured at wavelengths in green region of 520 to 590 nm.

TABLE 1

<Optical Property Gch 520-590 nm>

| Inorganic particle layer | Transmission axis transmittance | Absorption axis transmittance | Transmittance axis reflectance | Absorption axis transmittance |
|---|---|---|---|---|
| Ta | 94.7% | 16.5% | 0.9% | 3.3% |
| Si | 97.8% | 14.8% | 0.9% | 14.3% |
| Ta/Si | 95.3% | 13.9% | 0.5% | 2.9% |

In polarizing elements exhibiting equivalent contrasts, ideal property is high transmission axis transmittance and low reflectance. Concerning the properties of Example 1 and 2, Example 1 had an advantage of low reflectance but had an disadvantage of low transmittance. In contrast, Example 2 had an advantage of high transmittance but had a disadvantage of high reflectance. Comparing to these, Example 3 had an ideal property of high transmission axis transmittance and low reflectance. Although Example 3 has a strong wavelength selectivity, the wavelength range of low reflectance can be controlled by adjusting Si film thickness or $SiO_2$ film thickness.

Example 4

Absorption Axis Transmittances Versus Grid Widths

Figure 12:
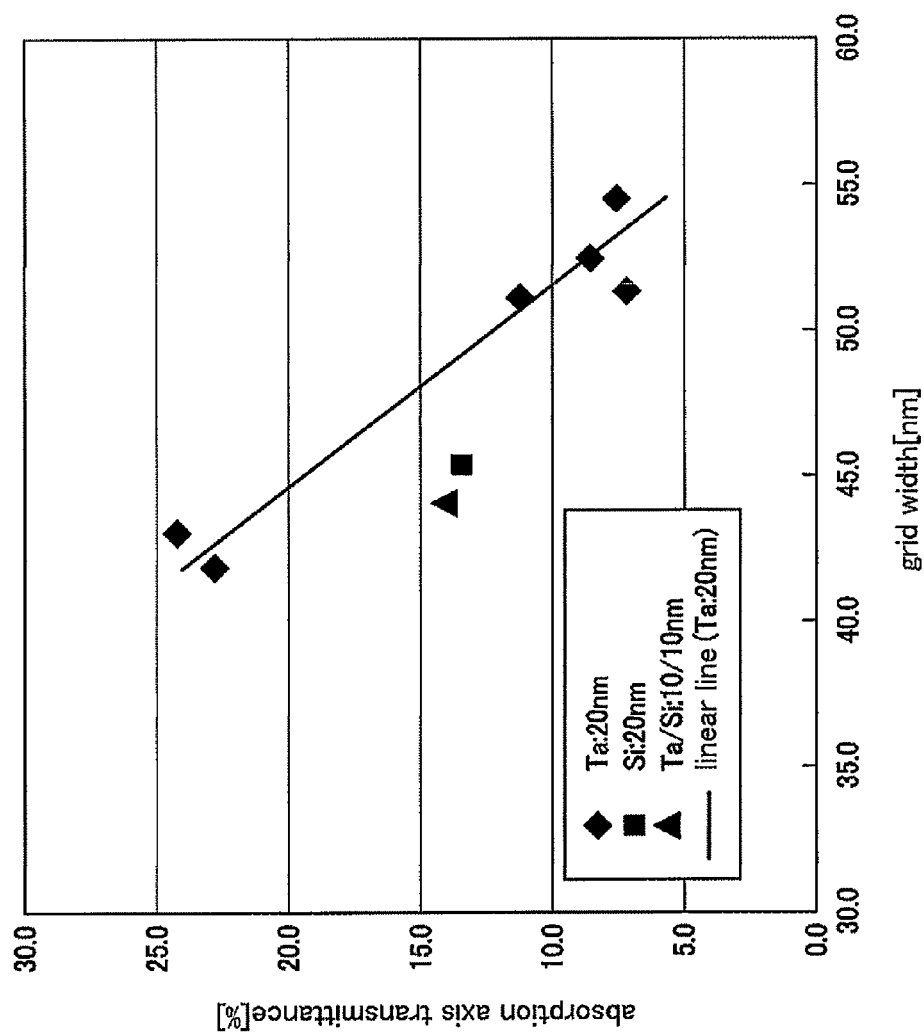
FIG. 12 is a graph showing a relationship between grid widths and absorption axis transmittances.

Next, absorption axis transmittances were measured while altering the grid width of the polarizing elements. FIG. 12 shows the relationships between the grid widths and the absorption axis transmittances. Note that the absorption axis transmittances are average values measured in green region of 520 to 590 nm. In this case, polarizing elements were used having convexity pitch of 150 nm, absorbing layer (Ta, Si, Ta/Si) thickness of 20 nm, $SiO_2$ thickness of 30 nm and AlSi thickness of 45 nm.

The result shown in FIG. 12 revealed that the polarizing element layering Ta and Si as the absorbing layer can reduce the absorption axis transmittance to the same extent as the polarizing element having Si single layer as the absorbing layer. In addition, it was revealed that the absorption transmittance can be controlled by grid width.

Example 5

Optical Properties Versus Layering Orders in the Absorbing Layer

Figure 13:
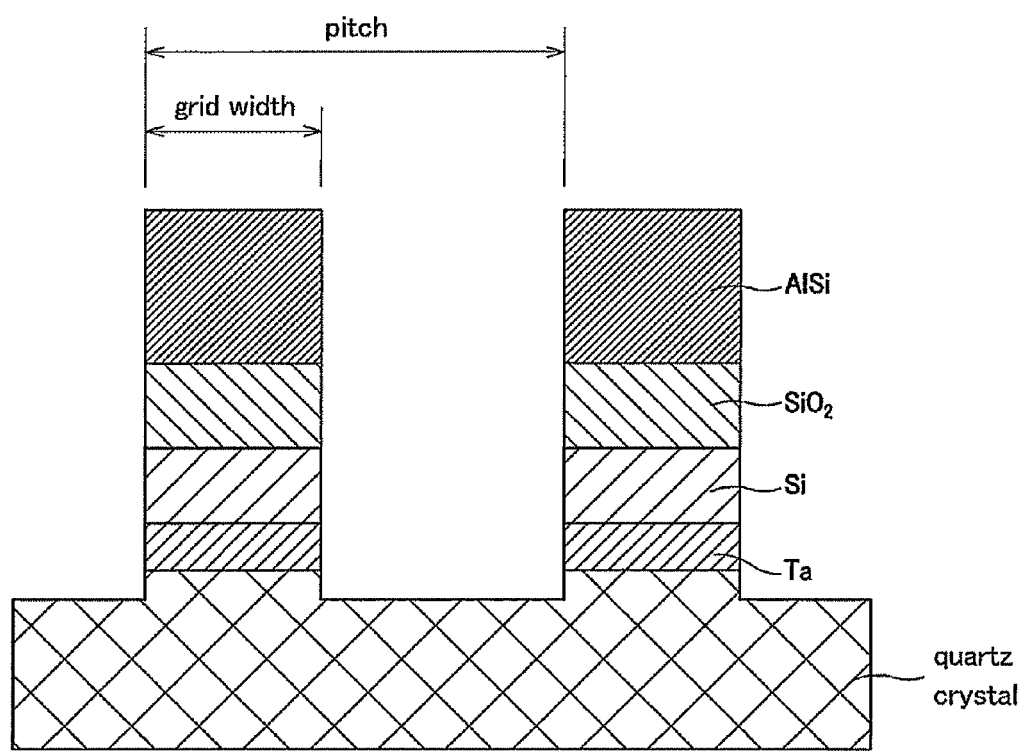
FIG. 13 is a schematic cross sectional view of a polarizing element layering Ta and Si on a quartz crystal substrate in this order (layering order A).
Figure 14:
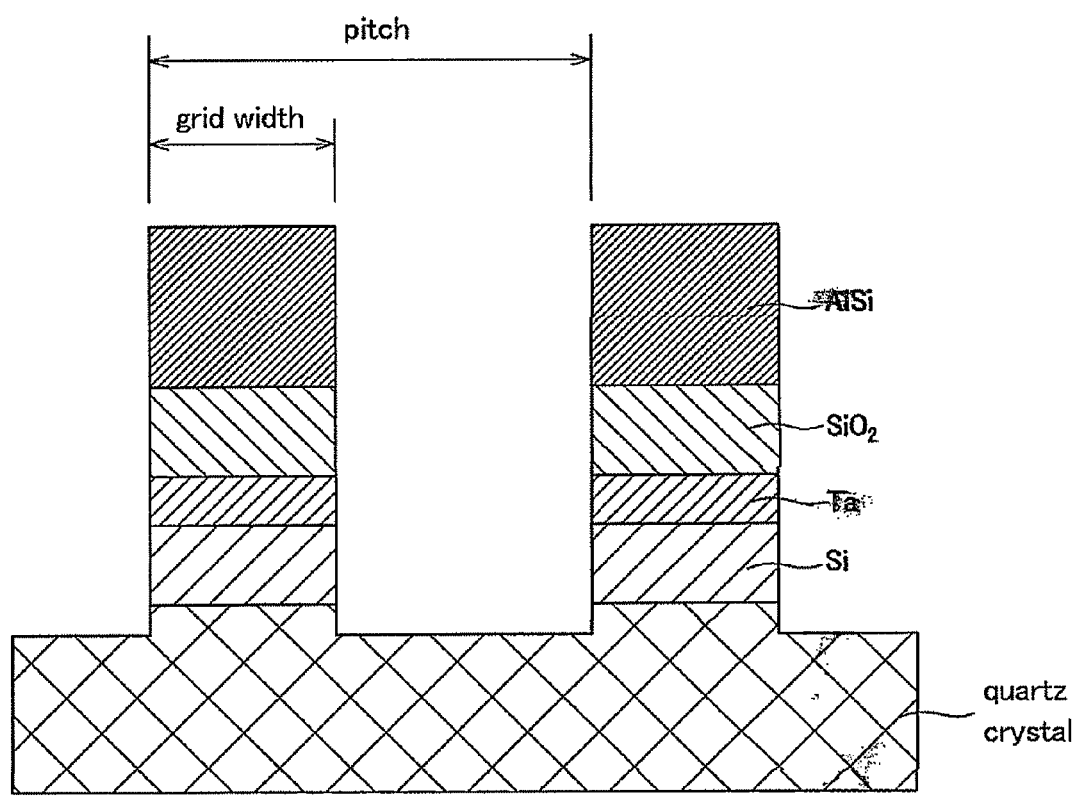
FIG. 14 is a schematic cross sectional view of a polarizing element layering Si and Ta on a quartz crystal substrate in this order (layering order B).
Figure 15:
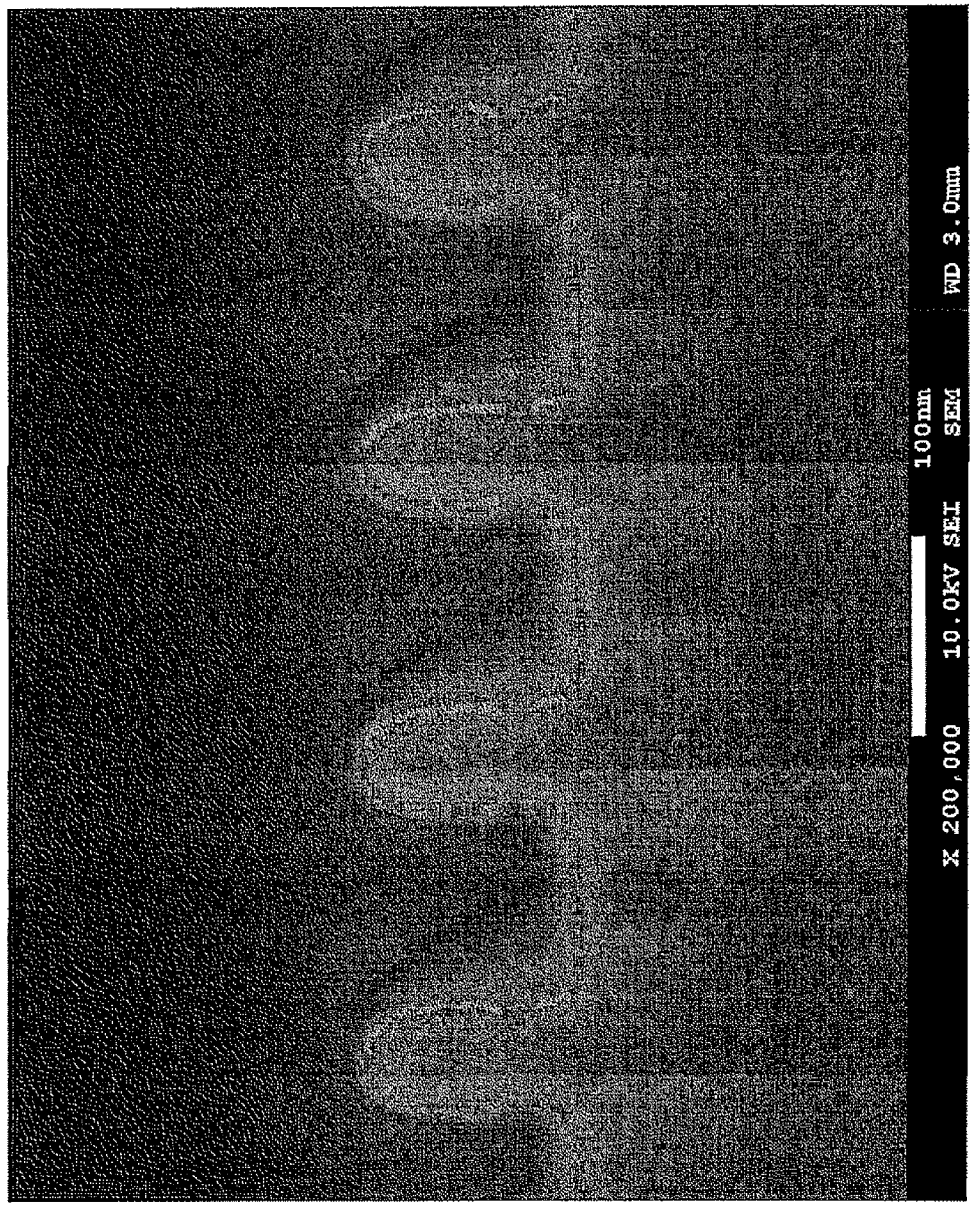
FIG. 15 is an SEM image of a cross section of a polarizing element having the layering order A.
Figure 16:
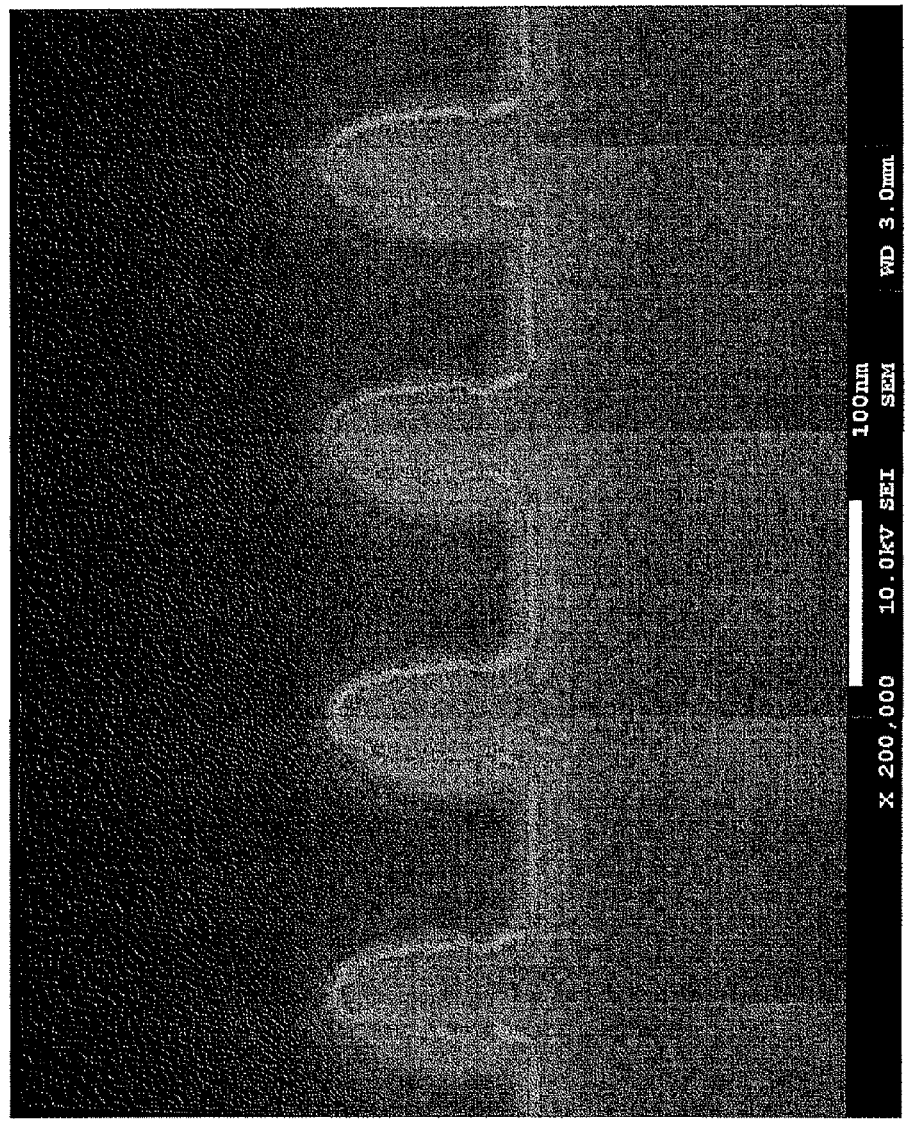
FIG. 16 is an SEM image of a cross section of a polarizing element having the layering order B.

A polarizing element layering Ta and Si on a quartz crystal substrate in this order (layering order A) as shown in FIG. 13 and a polarizing element layering Si and Ta on a quartz crystal substrate in this order (layering order B) as shown in FIG. 14 were manufactured. FIGS. 15 and 16 show SEM images of cross-sections of the polarizing elements with the layering order A and the layering order B, respectively.

These polarizing elements were designed to minimize reflectances at contrasts (extinction ratio:transmission axis transmittance/absorption axis transmittance) of 2 to 10 in green range (around 550 nm), which is practically important in liquid crystal display devices, with the pitch of 150 nm, grid width of 45 nm, Ta thickness of 5 nm, Si thickness of 20 nm, $SiO_2$ thickness of 30 nm and AlSi thickness of 35 nm. These polarizing elements with the layering orders of A and B were manufactured by the same processes as Example 1 except that the absorbing layers were formed as two-layer structure of Ta and Si.

Figure 17:
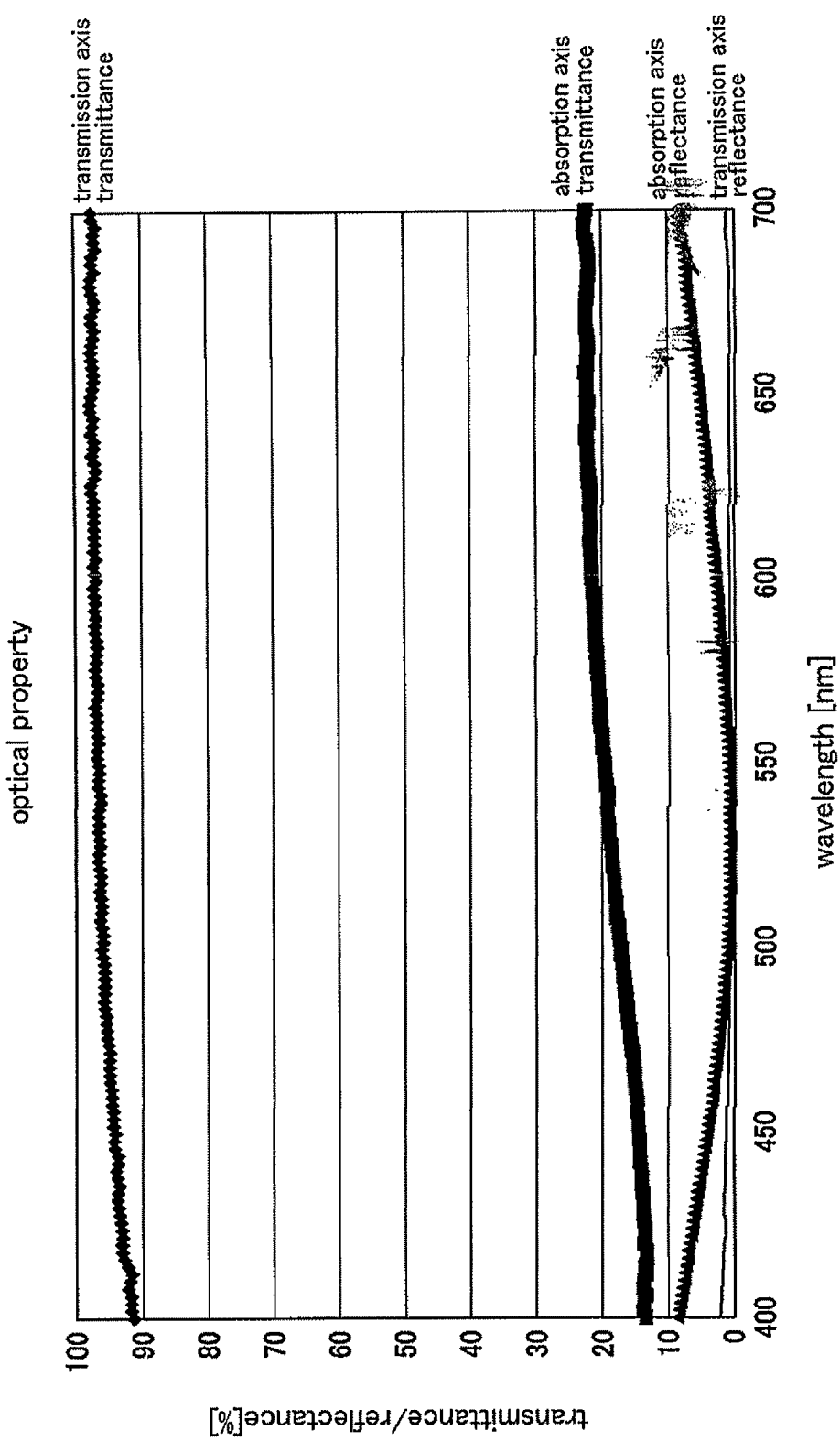
FIG. 17 is a graph showing optical properties of a polarizing element having the layering order A.
Figure 18:
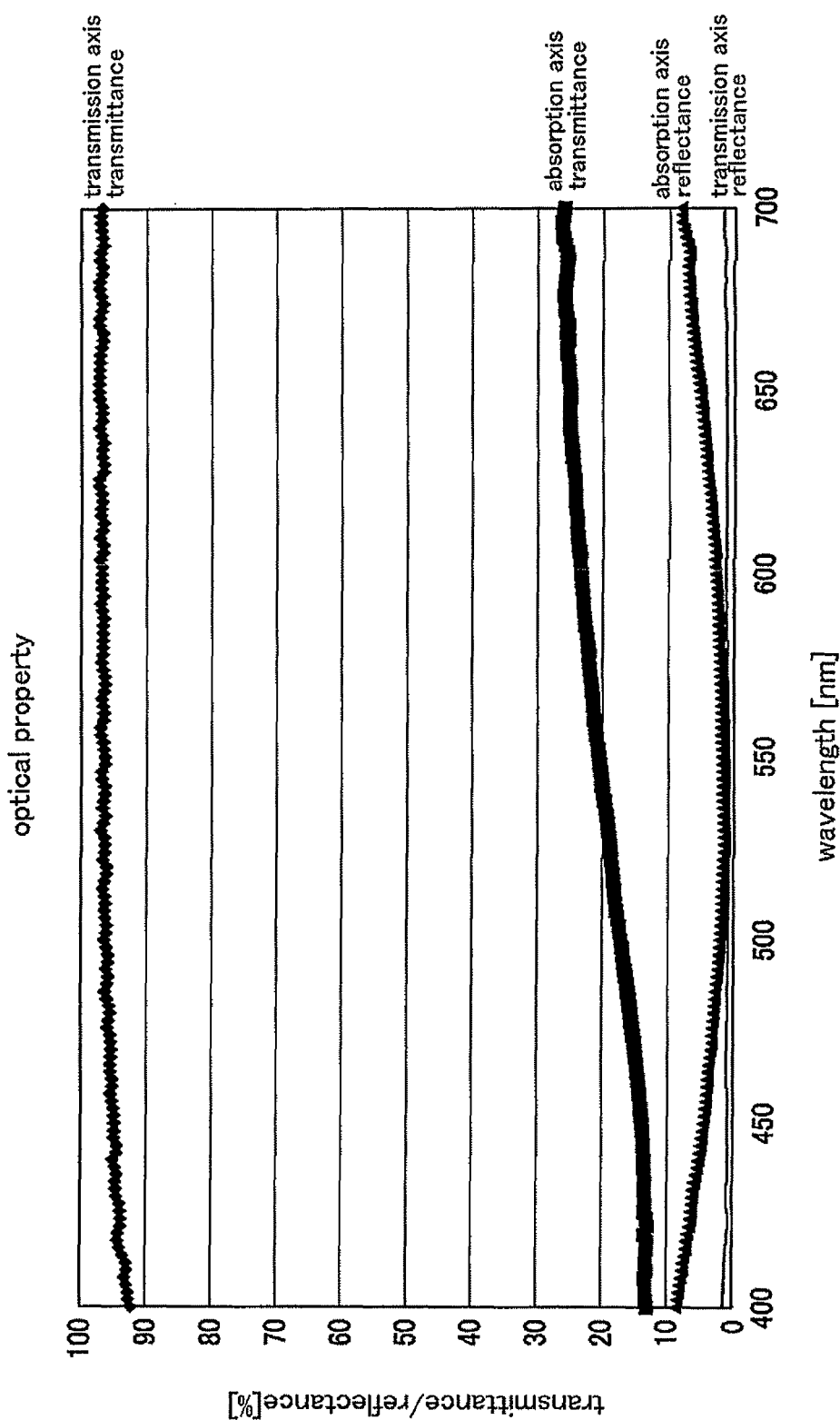
FIG. 18 is a graph showing optical properties of a polarizing element having the layering order B.

FIGS. 17 and 18 show the optical properties of the polarizing elements with the layering orders of A and B, respectively. Table 2 shows average values of transmittances and reflectances of the polarizing elements measured at wavelengths in blue region of 430 to 510 nm, green region of 520 to 590 nm and red region of 600 to 680 nm.

TABLE 2

| | BLUE 430-510 nm | | | | GREEN 520-590 nm | | | | RED 600-680 nm | | | |
|---|---|---|---|---|---|---|---|---|---|---|---|---|
| | Transmittance | | Reflectance | | Transmittance | | Reflectance | | Transmittance | | Reflectance | |
| | T-axis | A-axis | T-axis | A-axis | T-axis | A-axis | T-axis | A-axis | T-axis | A-axis | T-axis | A-axis |
| Layering order A: Ta/Si | 95.0 | 15.6 | 1.0 | 2.5 | 96.7 | 20.0 | 0.6 | 0.9 | 97.3 | 22.1 | 0.7 | 4.5 |
| Layering order B: Si/Ta | 95.6 | 15.4 | 0.9 | 3.3 | 96.8 | 21.0 | 1.0 | 1.6 | 97.1 | 24.9 | 1.3 | 4.5 |

T-axis: transmission axis
A-axis: absorption axis

The result shown in Table 2 revealed that both of the polarizing elements layering Ta and Si as the absorbing layer with the layering orders A and B can achieve a low reflectance and an excellent contrast in green range (520 to 590 nm).

Figure 19:
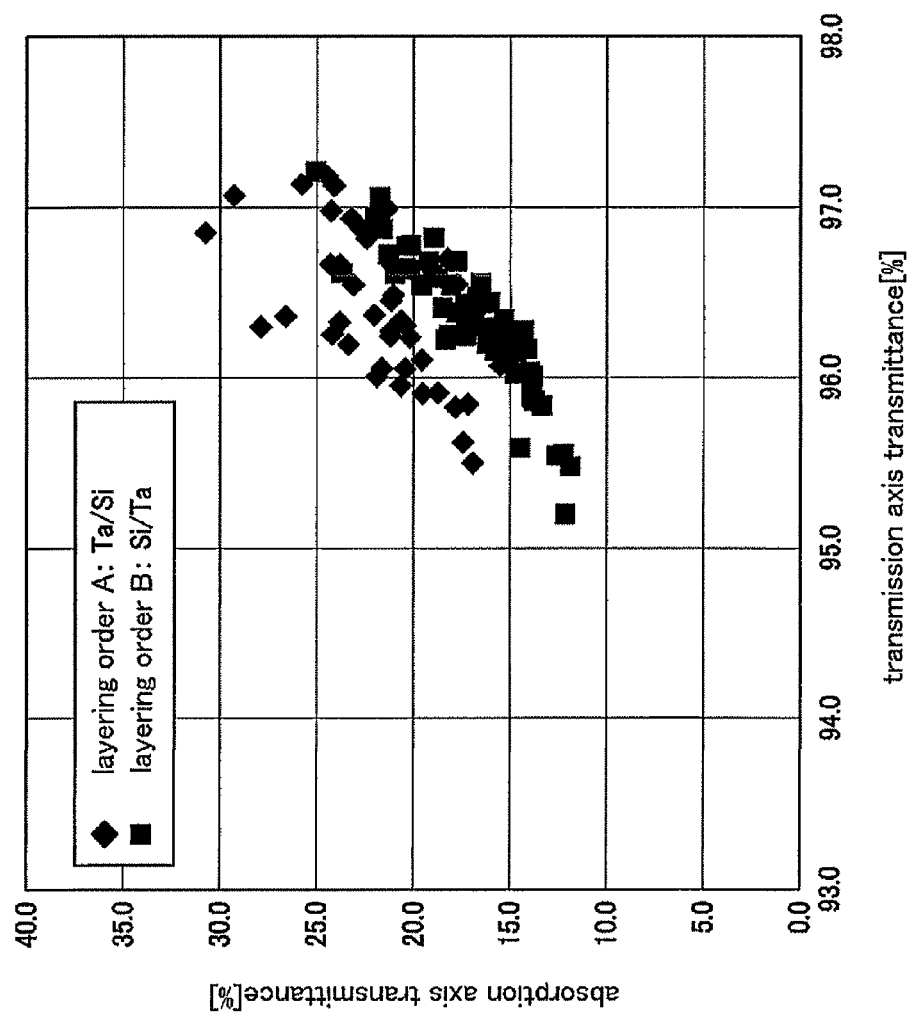
FIG. 19 is a graph showing transmittances in transmission axis and absorption axis at wavelengths in the green region.
Figure 20:
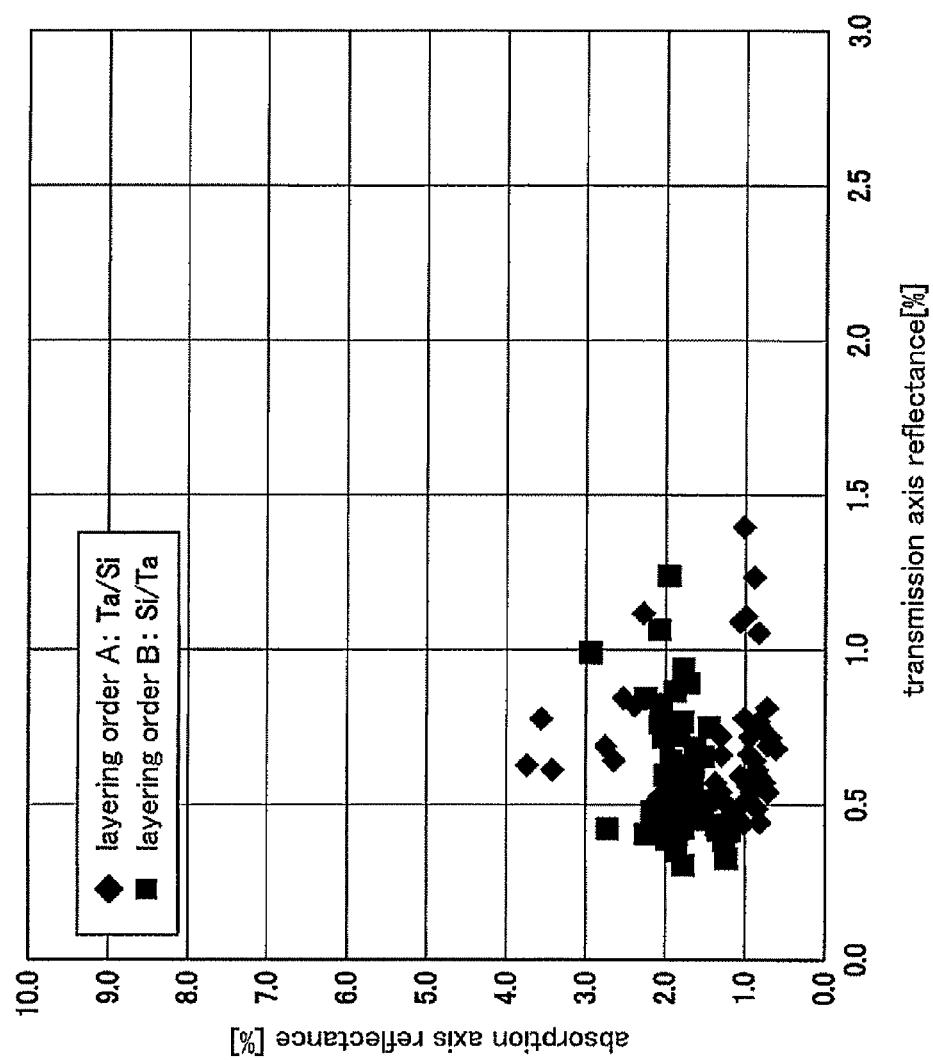
FIG. 20 is a graph showing reflectances in transmission axis and absorption axis at wavelengths in the green region.
Figure 21:
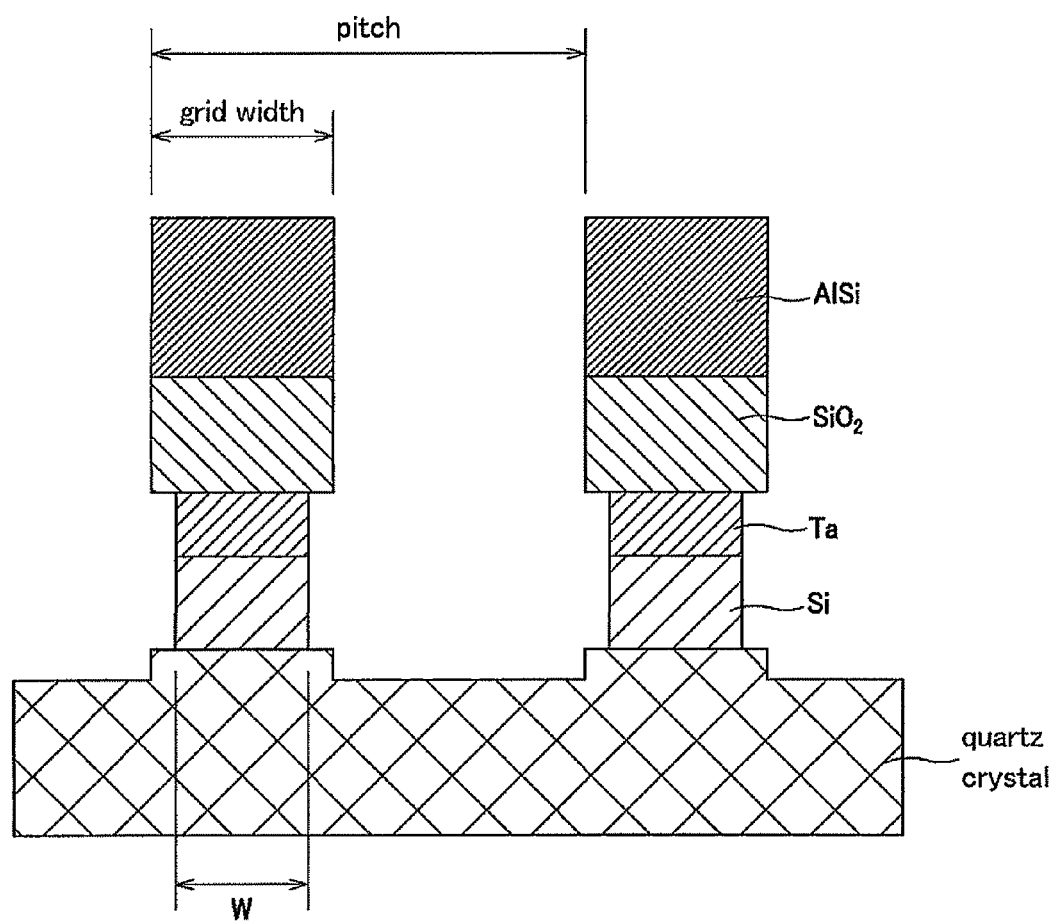
FIG. 21 is a schematic cross sectional view of a polarizing element having a narrower absorbing layer width W.
Figure 22:
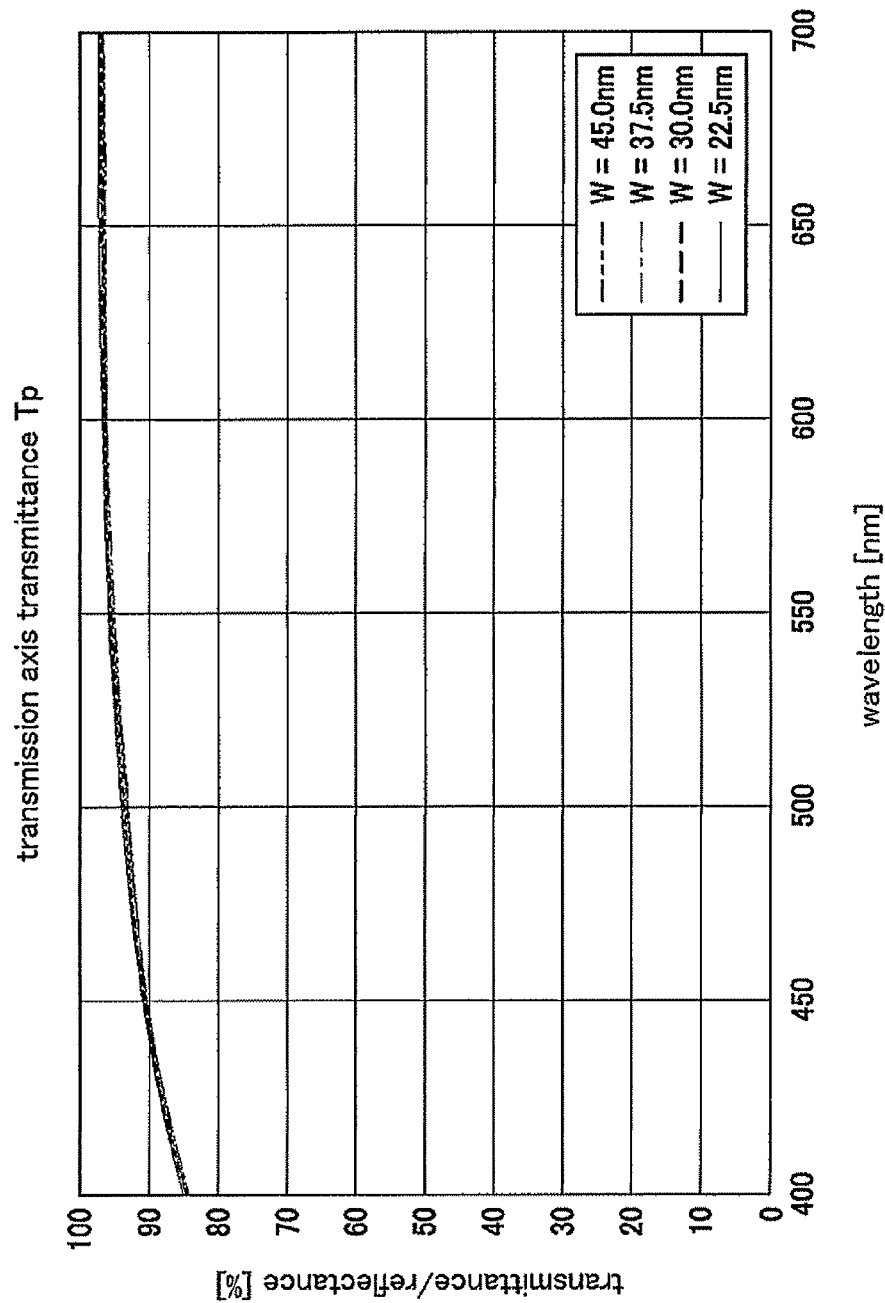
FIG. 22 is a graph showing a simulation result of transmission axis transmittance Tp versus the absorbing layer width W.
Figure 23:
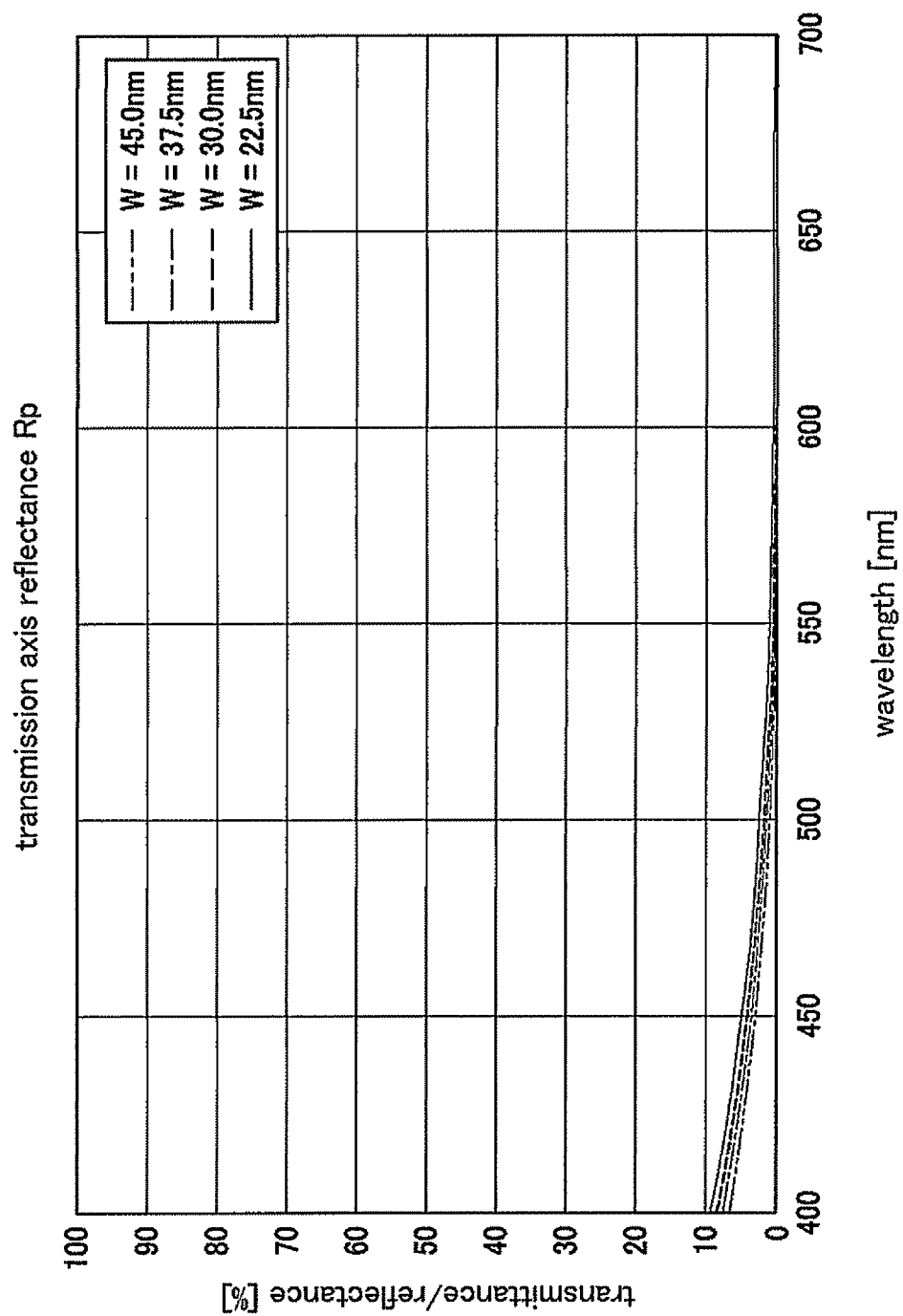
FIG. 23 is a graph showing a simulation result of transmission axis reflectance Rp versus the absorbing layer width W.
Figure 24:
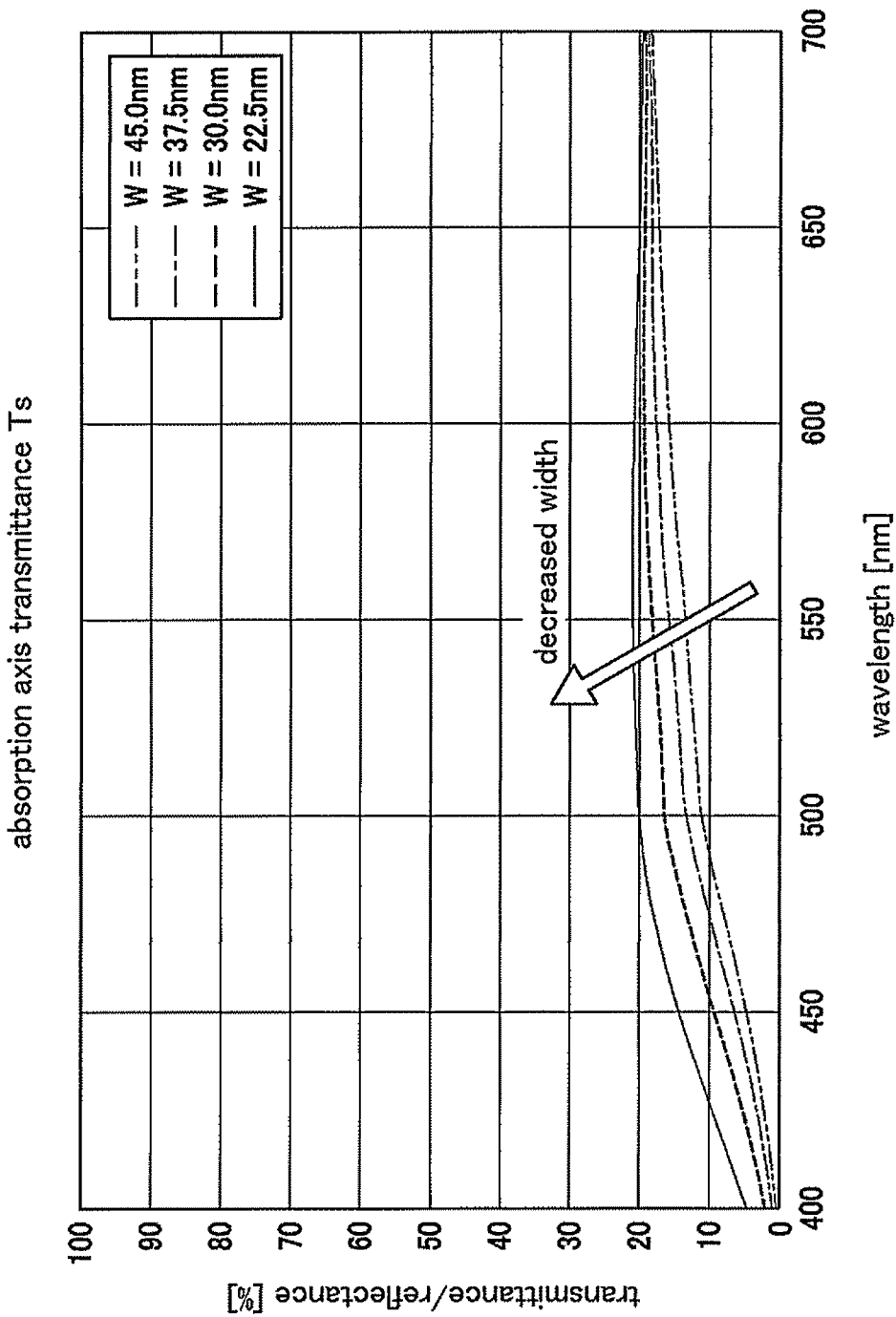
FIG. 24 is a graph showing a simulation result of absorption axis transmittance Ts versus the absorbing layer width W.
Figure 25:
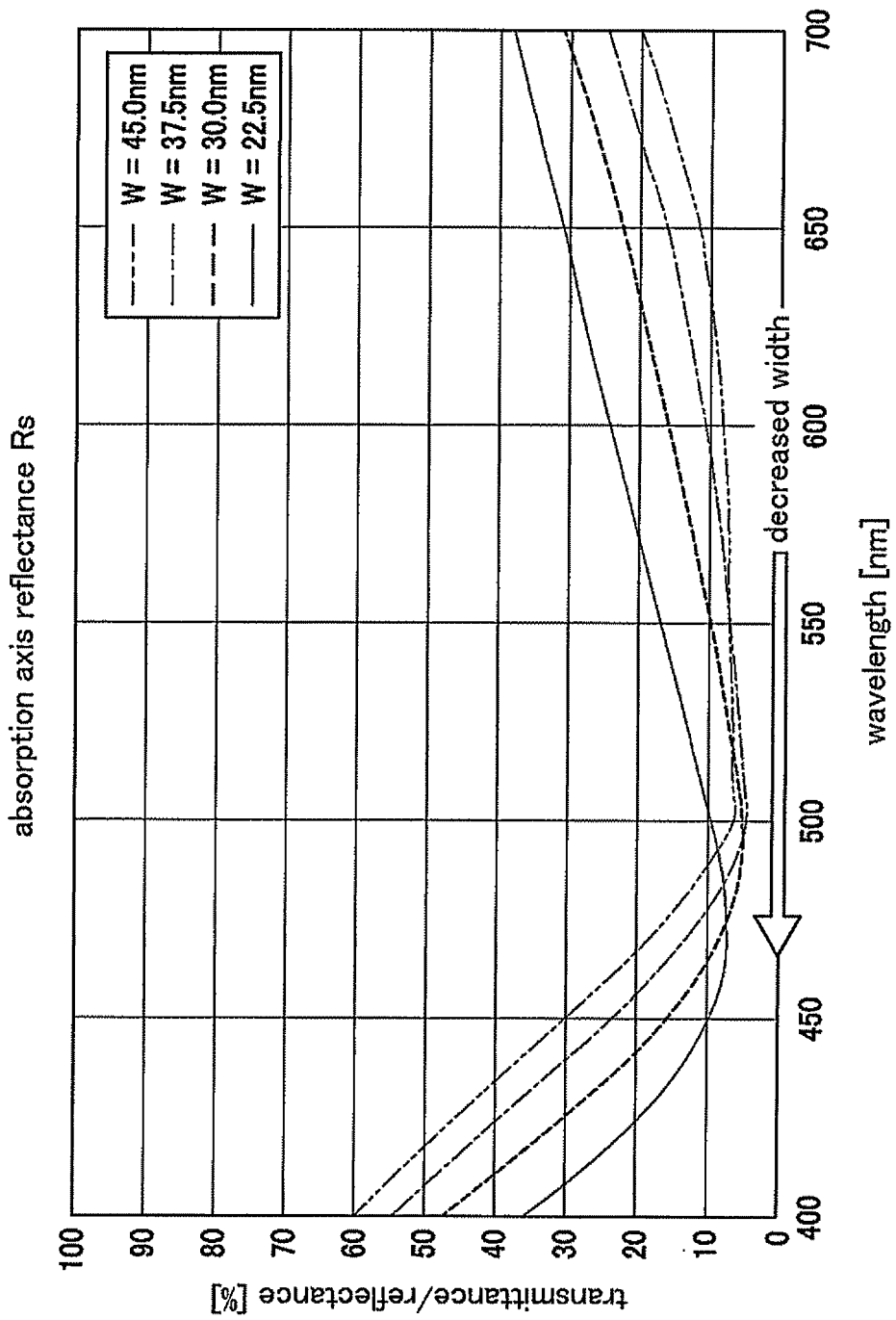
FIG. 25 is a graph showing a simulation result of absorption axis reflectance Rs versus the absorbing layer width W.

FIGS. 19 and 20 shows graphs plotting transmittances and reflectances in the transmission axis and the absorption axis measured at wavelengths in the green region of 520 to 590 nm. These results revealed that the transmittance of the layering order A was superior to that of the layering order B although there was no difference of the reflectance between the layering order A and the layering order B.

Example 6

Optical Properties Versus the Widths of the Absorbing Layer

Next, while changing the width W of the absorbing layer, effect of this change on optical properties is evaluated. Firstly, the optical property of polarizing elements having widths W of 40.0 nm, 37.5 nm, 30 nm and 22.5 nm were calculated by using a simulation software (Gsolver available from Grating Solver Development Company). Models of polarizing elements were used having a pitch of 150 nm, a grid-width of 45 nm, Ta thickness of 5 nm, Si thickness of 20 nm, $SiO_2$ thickness of 30 nm and AlSi thickness of 35 nm, and in which Si was layered on quartz crystal substrate according to the layering order B.

FIGS. 22 to 25 shows simulation results of transmission axis transmittance Tp, transmission axis reflectance Rp, absorption axis transmittance Ts and absorption axis reflectance Rs, respectively. In the transmittance axes shown in FIGS. 22 and 23, no substantial difference was observed Table 3 shows average values of transmittances and reflectances of the polarizing elements of sample A and sample B measured at wavelengths in blue region of 430 to 510 nm, green region of 520 to 590 nm and red region of 600 to 680 nm.

TABLE 3

| | BLUE 430-510 nm | | | | GREEN 520-590 nm | | | | RED 600-680 nm | | | |
|---|---|---|---|---|---|---|---|---|---|---|---|---|
| | Transmittance | | Reflectance | | Transmittance | | Reflectance | | Transmittance | | Reflectance | |
| | T-axis | A-axis | T-axis | A-axis | T-axis | A-axis | T-axis | A-axis | T-axis | A-axis | T-axis | A-axis |
| Layering order A: Si/Ta width 46.6 nm | 96.6 | 15.4 | 0.9 | 3.3 | 96.8 | 21.0 | 1.0 | 1.6 | 97.1 | 24.9 | 1.3 | 4.5 |
| Layering order B: Si/Ta width 41.0 nm | 96.6 | 20.2 | 1.0 | 1.0 | 97.4 | 25.9 | 1.1 | 2.8 | 97.6 | 28.6 | 1.3 | 8.8 |

T-axis: transmission axis
A-axis: absorption axis between the different absorbing layer widths W. In contrast, in the absorption axes shown in FIGS. 24 and 25, it was observed that the transmittance Ts increased and the wavelength minimizing the reflectance Rs shifted toward the short wavelength side as the width W decreased.

Next, above-described simulation results were verified by manufacturing polarizing elements having different absorbing layer widths W. The absorbing layer widths W (side etching amount) were adjusted by etching time of etching process using $CF_4/Ar$ gas. The polarizing element (width W=46.6 nm) mentioned above and shown in FIG. 16 was used as sample A.

Figure 26:
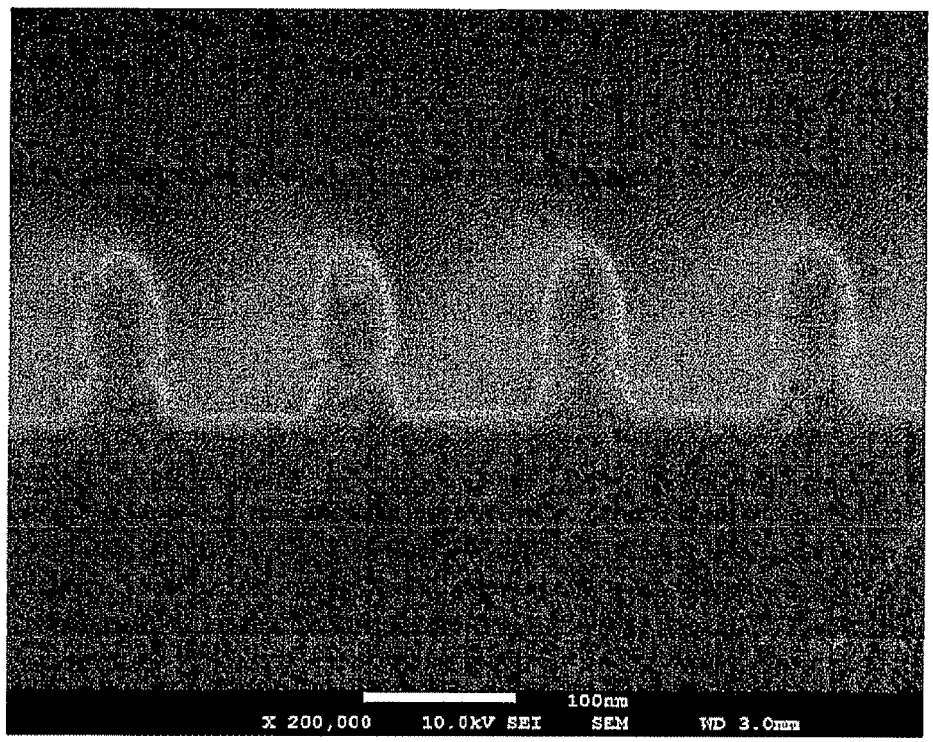
FIG. 26 is an SEM image of a cross section of a polarizing element having a narrower absorbing layer width W.
Figure 27:
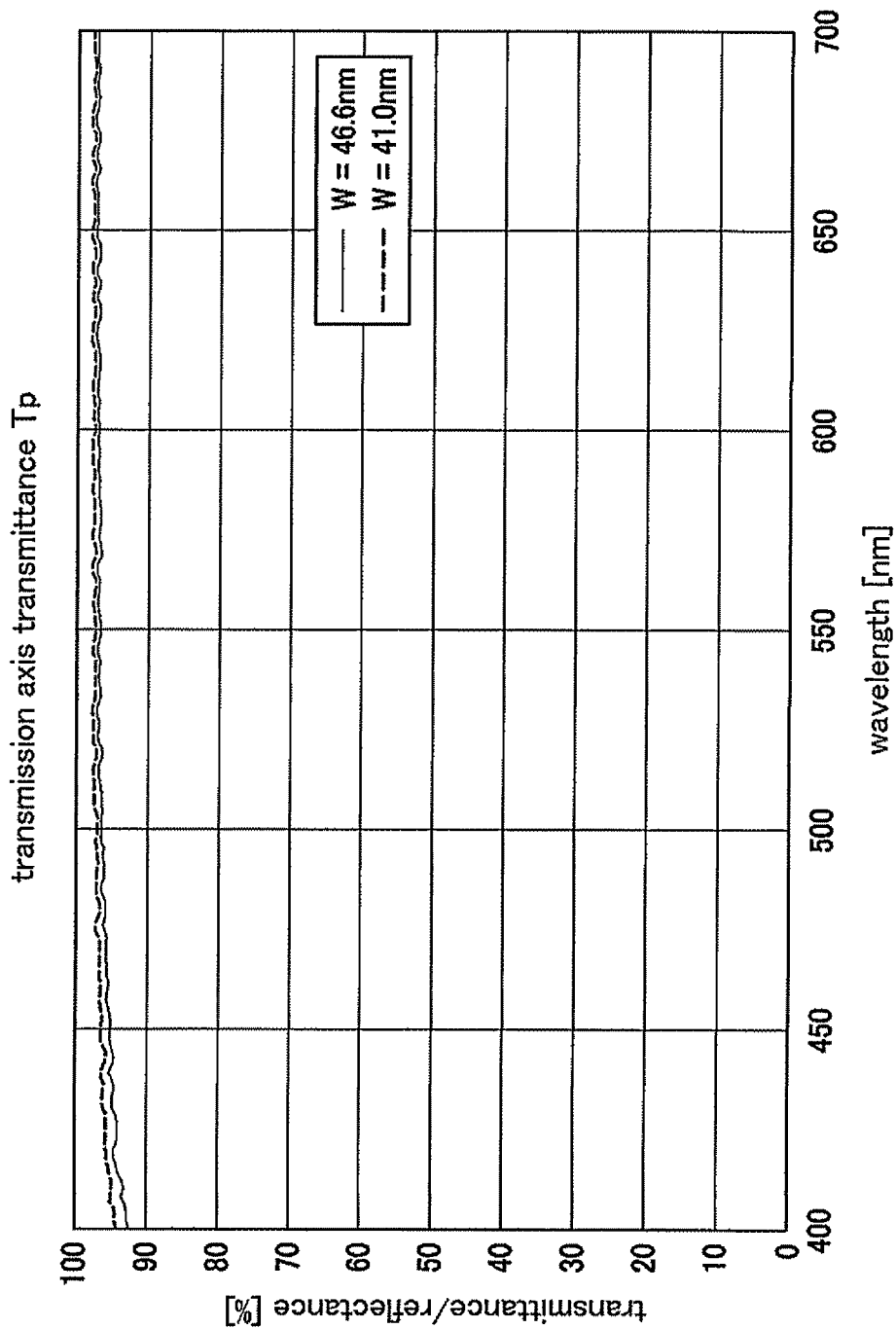
FIG. 27 is a graph showing a measured results of transmission axis transmittance Tp of samples A and B having different absorbing layer widths W.
Figure 28:
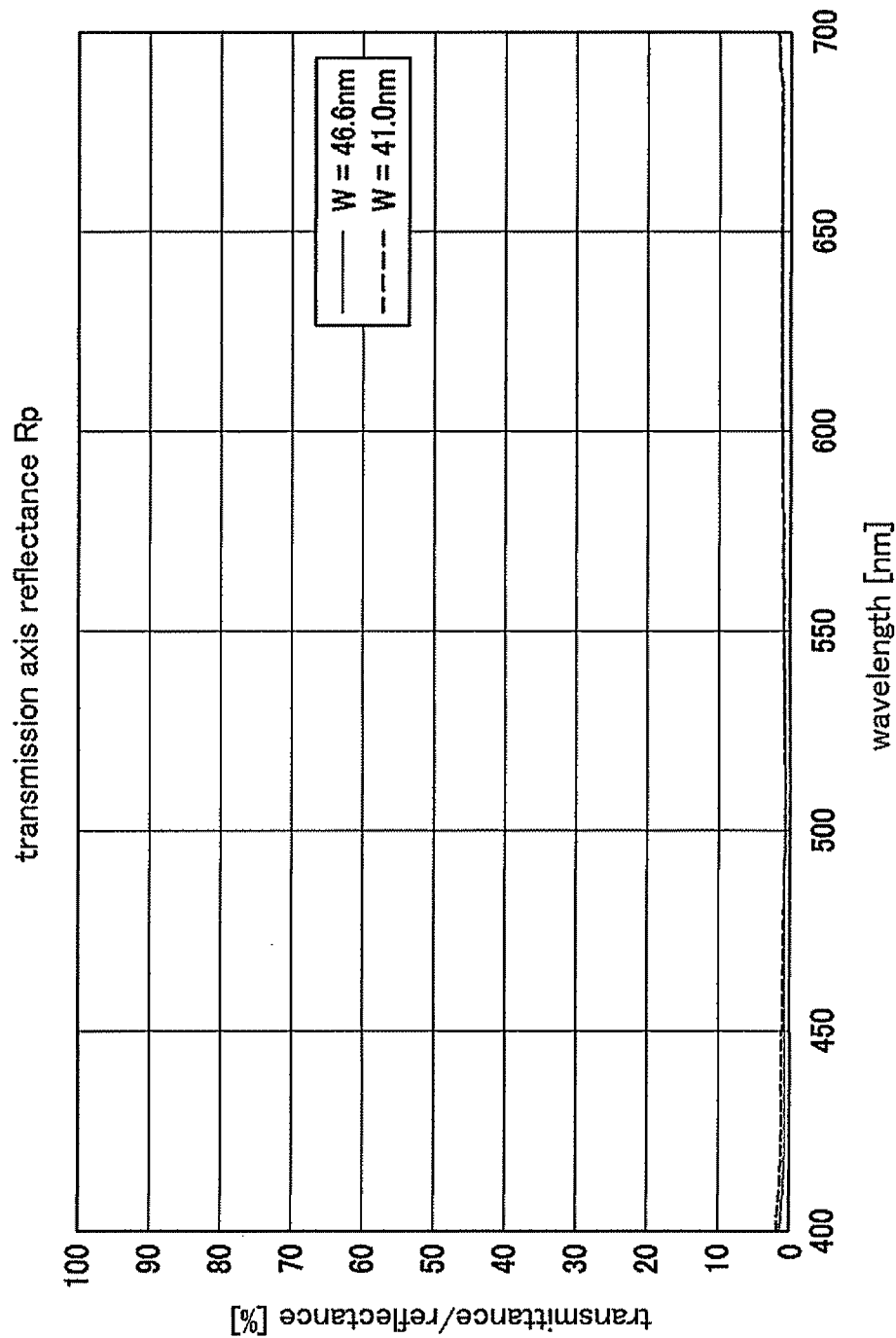
FIG. 28 is a graph showing a measured results of transmission axis reflectance Rp of samples A and B having different absorbing layer widths W.
Figure 29:
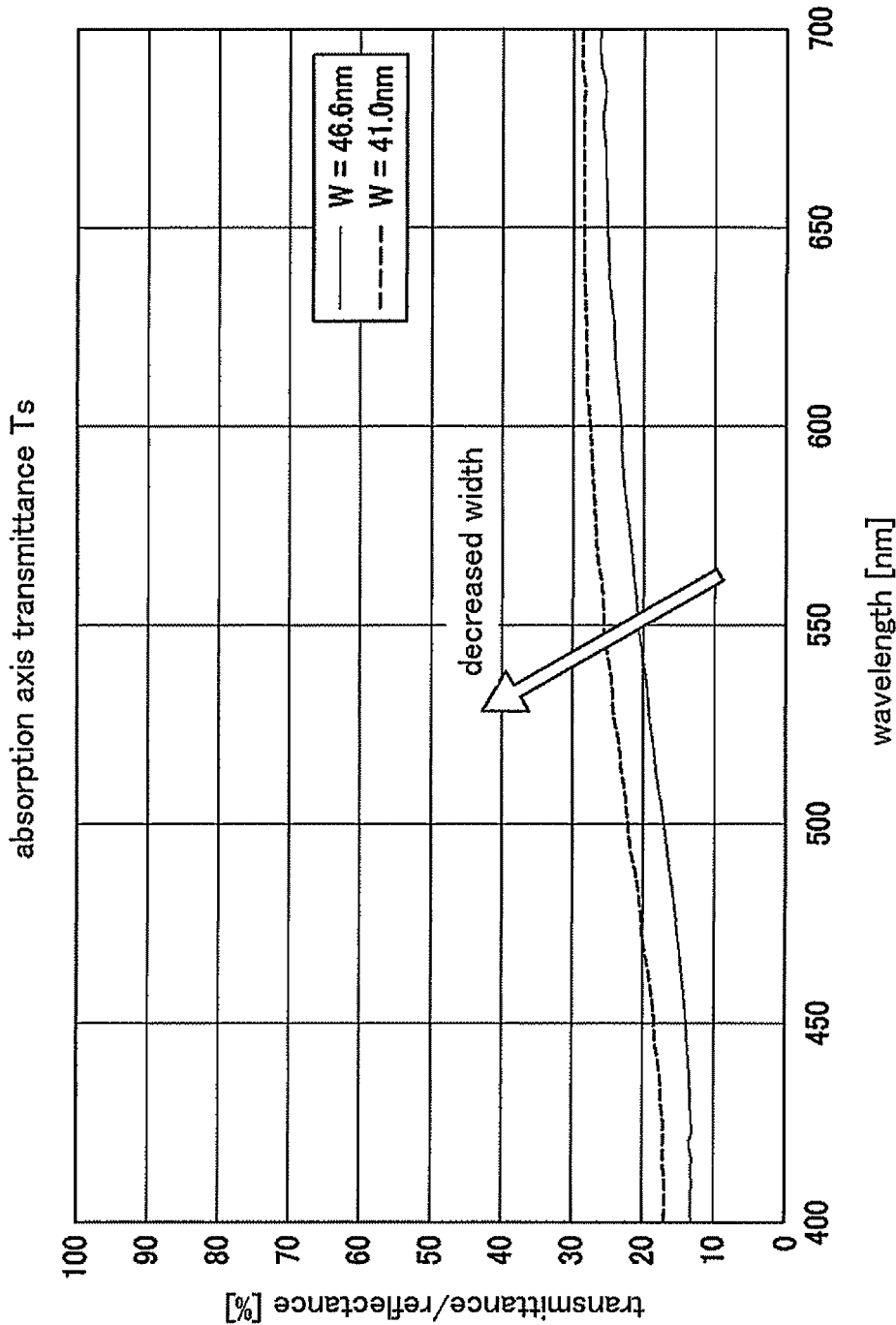
FIG. 29 is a graph showing a measured results of absorption axis transmittance Ts of samples A and B having different absorbing layer widths W.
Figure 30:
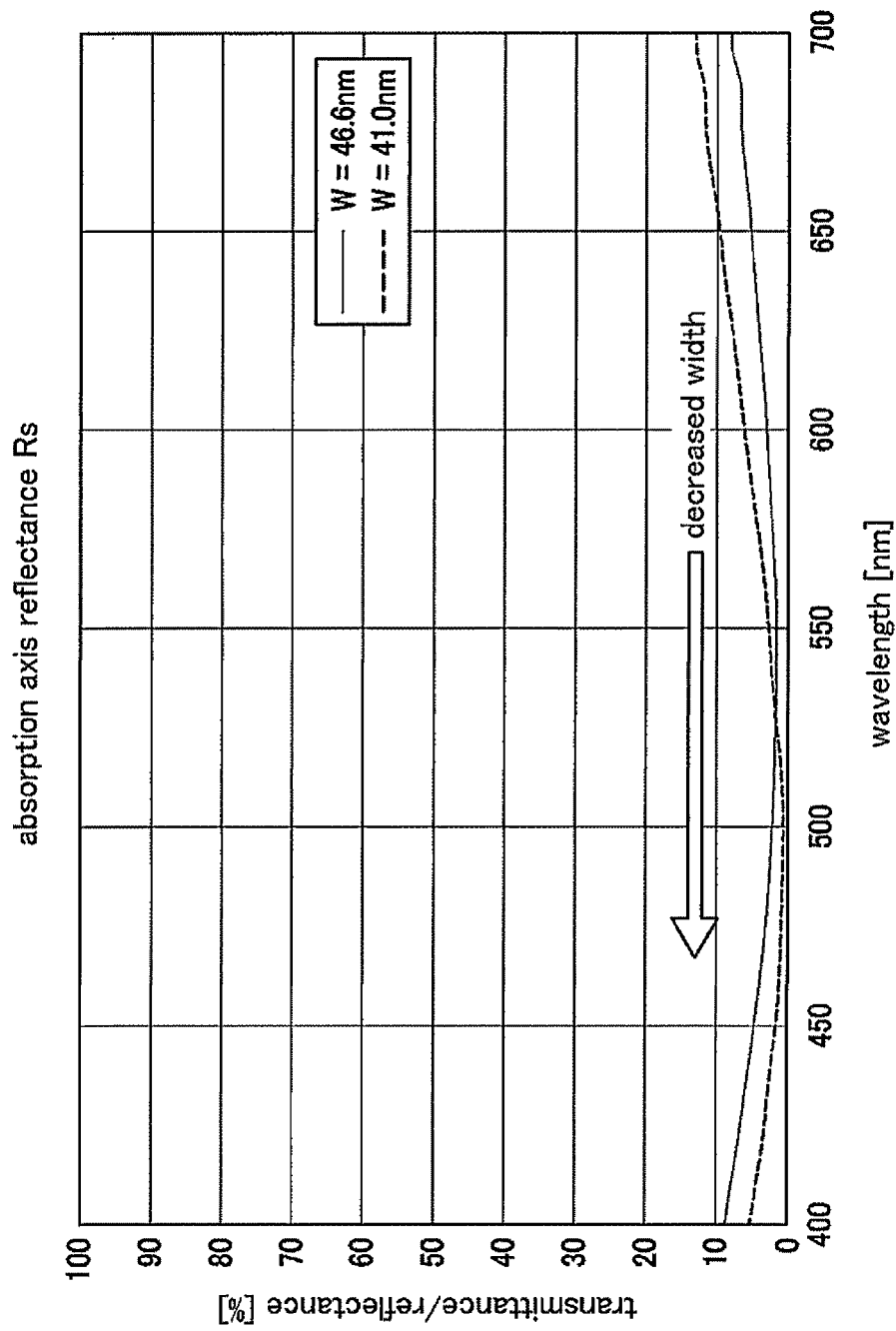
FIG. 30 is a graph showing a measured results of absorption axis reflectance Rs of samples A and B having different absorbing layer widths W.

FIG. 26 shows an SEM image of a cross section of the polarizing element having an absorbing layer width W smaller than the grid width. In this polarizing element, the absorbing layer width W was 41.0 nm. This polarizing element was used as sample B. This polarizing element was designed to minimize reflectances at contrasts (extinction ratio:transmission axis transmittance/absorption axis transmittance) of 2 to 10 in green range (around 550 nm), which is practically important in liquid crystal display devices, with the pitch of 150 nm, grid width of 45 nm, Ta thickness of 5 nm, Si thickness of 20 nm, $SiO_2$ thickness of 30 nm and AlSi thickness of 35 nm. This polarizing elements with the layering orders of B was manufactured by the same processes as Example 1 except that the absorbing layer was formed as two-layer structure of Ta and Si.

FIGS. 27 to 30 shows measured results of transmission axis transmittance Tp, transmission axis reflectance Rp, absorption axis transmittance Ts and absorption axis reflectance Rs, respectively. Similarly to the simulated cases, in the transmittance axes shown in FIGS. 27 and 28, no substantial difference was observed between the different absorbing layer widths W. On the other hand, in the absorption axes shown in FIGS. 29 and 30, it was observed that the transmittance Ts increased and the wavelength minimizing the reflectance Rs also shifted toward the short wavelength side as the width W decreased, but in this case, the shift amount was larger than that of the simulation. Consequently, it was revealed that a polarizing element having a lower reflectance in blue range (430 to 510 nm) could be obtained by making the absorption width W narrower.

The result shown in Table 3 revealed that sample B with narrower absorbing layer width had a higher transmittance. It was also revealed that sample B had an excellent absorption axis reflectance Rs in short wavelengths in the blue range (430 to 510 nm).

Example 7

Deposition of a Protective Film

Figure 31:
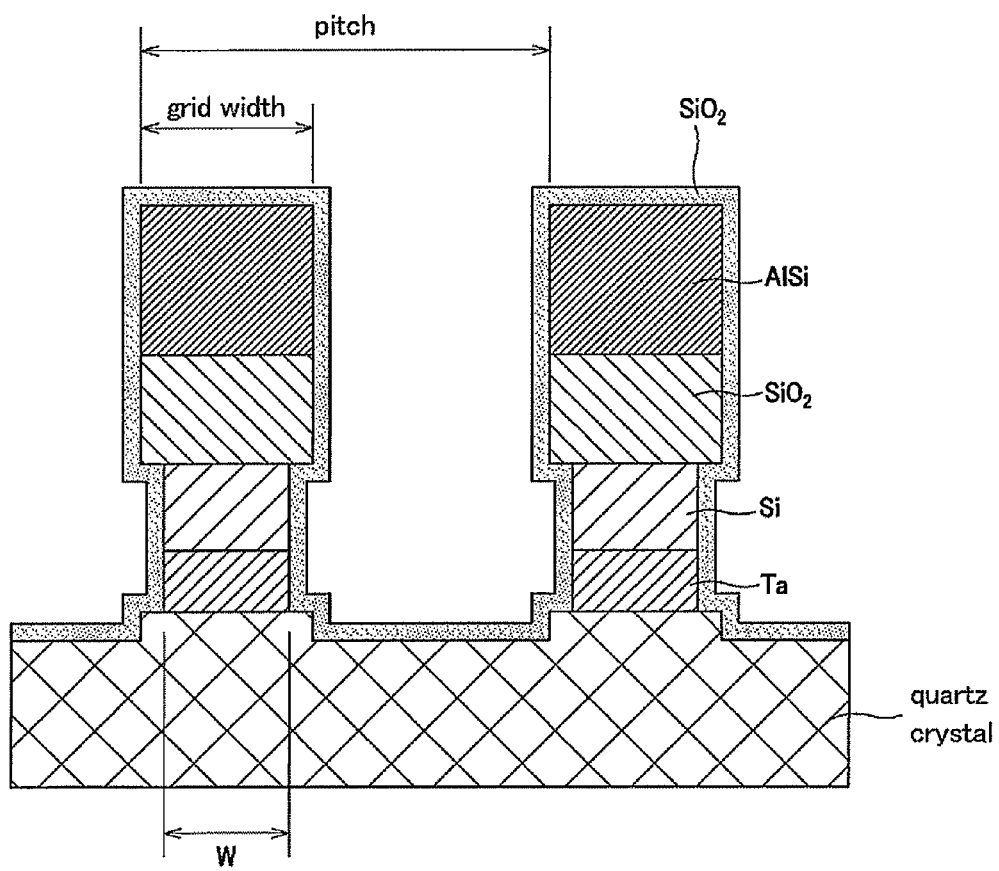
FIG. 31 is a schematic cross sectional view of a polarizing element having a protective film deposited thereon.

As shown in FIG. 31, a protective film of $SiO_2$ covering the grid shape was deposited in order to improve reliability such as moisture resistance. The thickness of this protective film was 7.5 nm and it was confirmed that this protective film was deposited also in the gaps between the grid-shaped convexities. This polarizing element was designed to minimize reflectances at contrasts (extinction ratio:transmission axis transmittance/absorption axis transmittance) of 2 to 10 in green range (around 550 nm), which is practically important in liquid crystal display devices, with the pitch of 150 nm, grid width including the protective film of 65 nm, Ta thickness of 5 nm, Si thickness of 20 nm, $SiO_2$ thickness of 30 nm and AlSi thickness of 35 nm. In the shape of the convexities, the width of the Ta/Si layer was made narrower than those of the other layers by etching process using $CF_4/Ar$ gas, and the quartz crystal substrate was also recessed by 5 nm. In other words, this polarizing element was manufactured by using the same process as the polarizing element shown in FIG. 13 and having the layering order A, and then depositing a protective film thereon. In order to achieve an excellent coatability, the protective film was deposited by plasma chemical vapor deposition (CVD) using tetra ethyl ortho silicate (TEOS) and $O_2$ as source gases.

Figure 32:
FIG. 32 is an SEM image of a cross section of a polarizing element having a protective film deposited thereon.

FIG. 32 shows an SEM image of a cross section of a polarizing element having a protective film formed thereon. From this cross-sectional image, it was observed that the width of the absorbing layer in transmission axis direction was narrower than those of the other layers (the reflective layer and the dielectric layer). Although the border between the layered convexities and the protective film is unclear in this cross-sectional image, the length from the interface between the AlSi and $SiO_2$ to the top of the convexity (thickness of AlSi plus the protective film) was measured to be 42 nm by an actual measurement. By subtracting the AlSi film thickness design value of 35 nm from this thickness, the thickness of the protective film can be estimated to be 7 nm.

Figure 33:
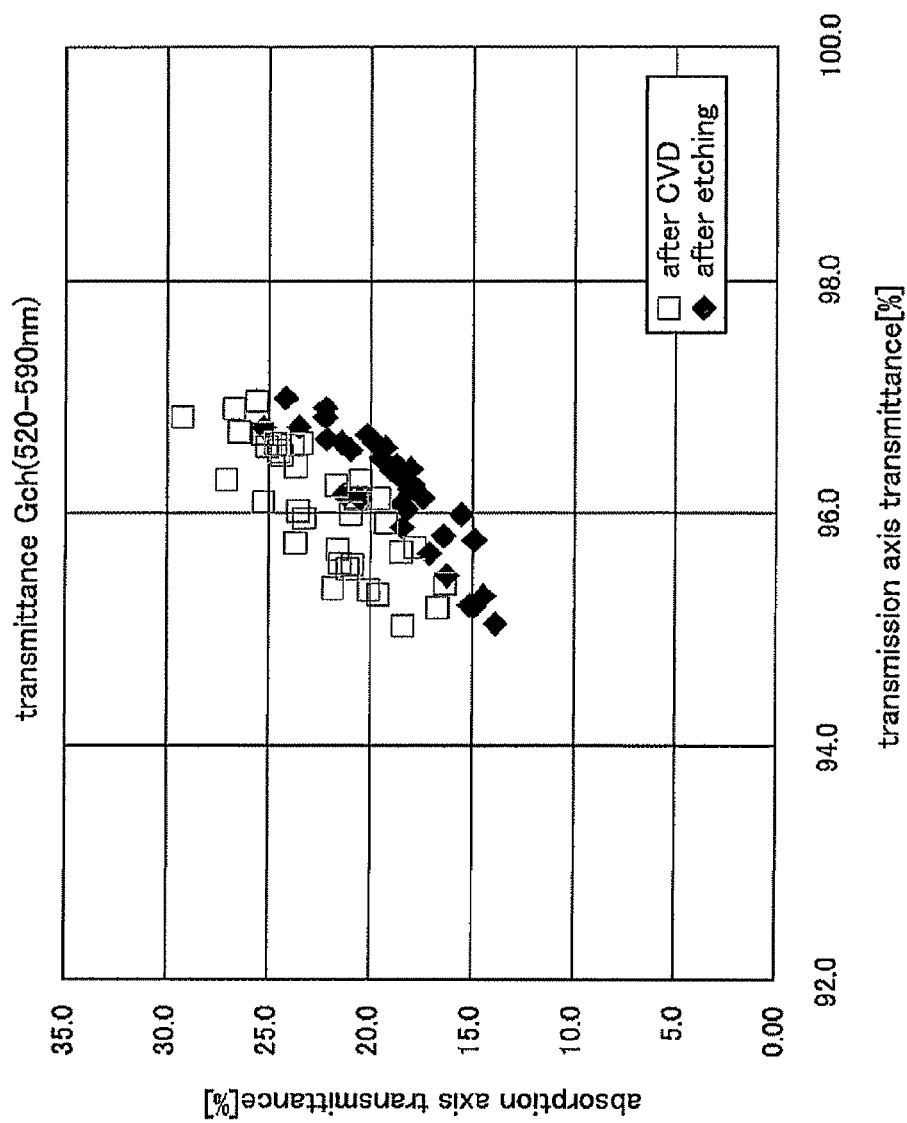
FIG. 33 is a graph showing transmittances of a polarizing element having a protective film deposited thereon.
Figure 34:
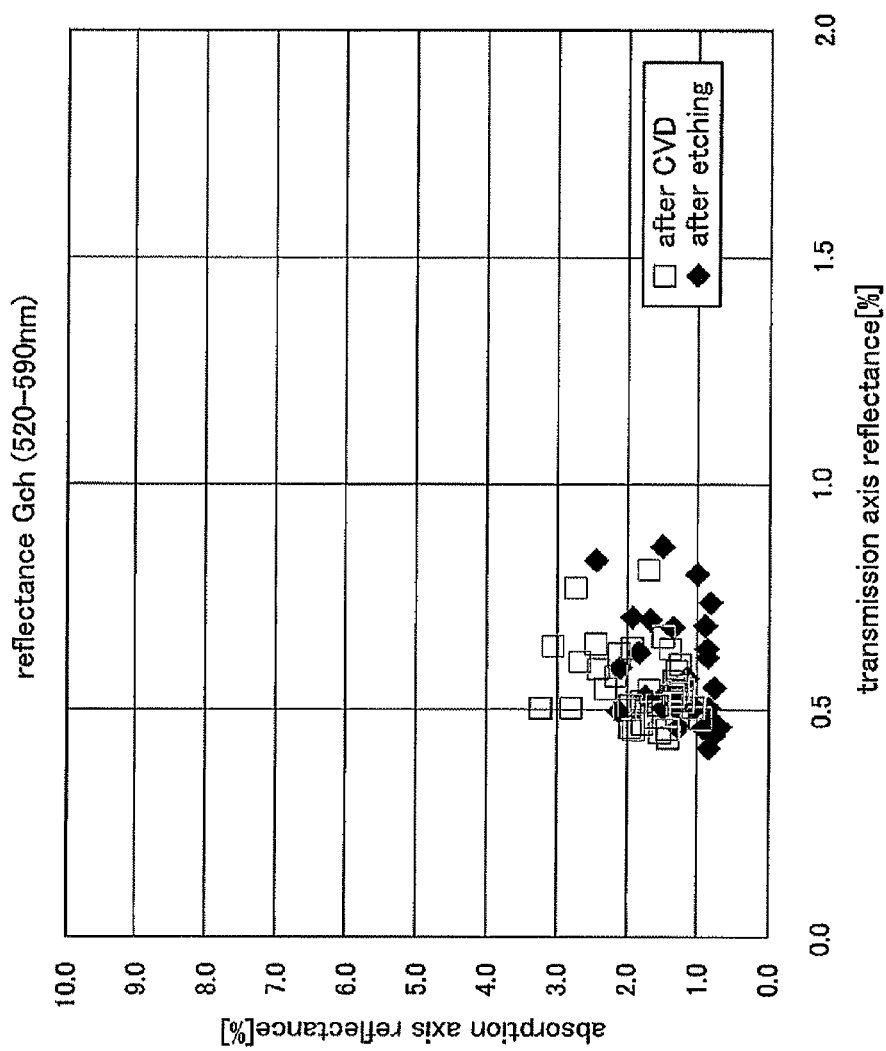
FIG. 34 is a graph showing reflectances of a polarizing element having a protective film deposited thereon.

FIGS. 33 and 34 are graphs respectively showing transmittance and reflectance of the polarizing element having a protective film deposited thereon. Transmission axis transmittance, transmission axis reflectance, absorption axis transmittance and absorption axis reflectance were measured on a polarizing element after the etching by $CF_4$/Ar gas and on a polarizing element after forming a protective film by plasma CVD, respectively (n=36).

The average values (n=36) of the amount of changes from the polarizing element after etched by $CF_4$/Ar gas to the polarizing element after formed thereon a protective film by plasma CVD were −0.1% in transmission axis transmittance, +3.4% in absorption axis transmittance, ±0.0% in transmission axis reflectance and +0.5% in absorption axis reflectance. In the polarizing element according to the present embodiment, the amount of the change in reflectance was almost zero and the amount of the change in transmittance was small. Similar result was obtained also in the case of depositing a protective film on the polarizing element shown in FIG. 14 and having the layering order B.

REFERENCE SIGNS LIST 1 polarizing element, 11 transparent substrate, 12 absorbing layer, 13 dielectric layer, 14 reflective layer, 50 liquid crystal panel, 60 cross dichroic prism, 100 liquid crystal projector

The invention claimed is:

1. A polarizing element comprising:
a transparent substrate;
an absorbing layer constituting, on the transparent substrate, grid-shaped convexities arrayed at a pitch smaller than a wavelengths in a used optical bandwidth;
a dielectric layer formed on the absorbing layer constituting the grid-shaped convexities; and
a reflective layer formed on the dielectric layer constituting the grid-shaped convexities, wherein each convexity is formed by the absorbing layer, the dielectric layer and the reflective layer.

2. The polarizing element according to claim 1, comprising a protective film for covering surfaces of the transparent substrate and the grid-shaped convexities.

3. The polarizing element according to claim 2, wherein the protective film is formed by Chemical Vapor Deposition (CVD).

4. The polarizing element according to claim 1, wherein the absorbing layer has a refractive index higher than that of the transparent substrate.

5. The polarizing element according to claim 1, wherein the absorbing layer comprises two or more layers and one of the layers has a refractive index higher than that of the transparent substrate.

6. The polarizing element according to claim 1, wherein the absorbing layer is formed of one or more of materials selected from the group of a metal material and a semiconductor material.

7. The polarizing element according to claim 1, wherein the thermal conductivity of the material constituting the absorbing layer is higher than the thermal conductivity of the material constituting the transparent substrate.

8. The polarizing element according to any claim 1, wherein
the absorbing layer comprises two layers of a Ta layer and a Si layer.

9. The polarizing element according to claim 8, wherein the Si layer is formed on the transparent substrate.

10. The polarizing element according to claim 1, wherein the width of the absorbing layer in the transmission axis direction is less than 100% but more than 50% of the width of the dielectric layer.

11. The polarizing element according to claim 1, wherein the transparent substrate is formed of quartz crystal or sapphire.

12. The polarizing element according to claim 1, wherein the transparent substrate is formed of quartz crystal and the grid-shaped convexities are arranged in parallel or perpendicular direction relative to the optical axis of the quartz crystal.

13. The polarizing element according to claim 4, wherein the thermal conductivity of the material constituting the absorbing layer is higher than the thermal conductivity of the material constituting the transparent substrate.

14. The polarizing element according to claim 5, wherein the thermal conductivity of the material constituting the absorbing layer is higher than the thermal conductivity of the material constituting the transparent substrate.

15. The polarizing element according to claim 5, wherein the absorbing layer comprises two layers of a Ta layer and a Si layer.

16. The polarizing element according to claim 4, wherein the width of the absorbing layer in the transmission axis direction is less than 100% but more than 50% of the width of the dielectric layer.

17. The polarizing element according to claim 5, wherein the width of the absorbing layer in the transmission axis direction is less than 100% but more than 50% of the width of the dielectric layer.

18. The polarizing element according to claim 8, wherein the transparent substrate is formed of quartz crystal or sapphire.

19. The polarizing element according to claim 9, wherein the transparent substrate is formed of quartz crystal or sapphire.

20. A projector comprising:
a polarizing element;
a light source; and
an image display panel,
wherein the polarizing element comprises a transparent substrate, an absorbing layer constituting, on the transparent substrate, grid-shaped convexities arrayed at a pitch smaller than wavelengths in a used optical bandwidth, a dielectric layer formed on the absorbing layer constituting the grid-shaped convexities, and a reflective layer formed on the dielectric layer constituting the grid-shaped convexities, wherein each of the convexities is formed by the absorbing layer, the dielectric layer and the reflective layer, and
wherein the polarizing element receives light in the used optical bandwidth from the light source at a side close to the transparent substrate and transmits the light.

* * * * *